US011087195B2

(12) United States Patent
Pinto et al.

(10) Patent No.: US 11,087,195 B2
(45) Date of Patent: Aug. 10, 2021

(54) MEMORY CARD PAD LAYOUT SUPPORTING MULTIPLE COMMUNICATION PROTOCOLS

(71) Applicant: WESTERN DIGITAL TECHNOLOGIES, INC., San Jose, CA (US)

(72) Inventors: Yoseph Pinto, Tel Aviv (IL); Shajith Musaliar Sirajudeen, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/375,529

(22) Filed: Apr. 4, 2019

(65) Prior Publication Data

US 2020/0210800 A1    Jul. 2, 2020

(30) Foreign Application Priority Data

Dec. 31, 2018 (IN) .............................. 201841049940
Jan. 21, 2019 (IN) .............................. 201941002542

(51) Int. Cl.
*G06K 19/06* (2006.01)
*G06K 19/077* (2006.01)

(52) U.S. Cl.
CPC . *G06K 19/07732* (2013.01); *G06K 19/07739* (2013.01)

(58) Field of Classification Search
CPC .......................... G06K 19/00; G06K 19/06046
(Continued)

(56) References Cited

U.S. PATENT DOCUMENTS 7,458,519 B2 * 12/2008 Aoki .................... G06K 19/077
235/451
8,291,144 B2 * 10/2012 Pinto .................... G06F 13/409
710/301
(Continued)

FOREIGN PATENT DOCUMENTS

KR    1020030072334    9/2003
KR    1020120055553    5/2012
(Continued)

OTHER PUBLICATIONS

English language Abstract for KR1020120055553 published May 31, 2012.
(Continued)

*Primary Examiner* — Daniel St Cyr
(74) *Attorney, Agent, or Firm* — Vierra Magen Marcus LLP

(57) ABSTRACT

Memory cards having a nano card form factor configured according to different card standards. The nano card have a pair of opposed surfaces having a length and width of a nano SIM card in which a first group of interface pads on one of the opposed surfaces configured to mate with contact pins of a host device card slot operating per a PCIe memory card standard and a second group of interface pads configured to mate with contact pins of a host device card slot operating per a second memory card standard different than the PCIe memory card standard. The nano cards have patterns of pads allowing for vertical and horizontal insertion to a host device card slot being backward compatible with legacy host device card slots.

20 Claims, 17 Drawing Sheets

(58) Field of Classification Search
USPC .................................................. 235/487, 492
See application file for complete search history.

(56) References Cited

U.S. PATENT DOCUMENTS

| | | | |
|---|---|---|---|
| 9,647,359 B2 * | 5/2017 | Cho ................... | H01R 12/7076 |
| 2007/0259567 A1 * | 11/2007 | Chen ............... | G06K 19/07739 |
| | | | 439/638 |
| 2010/0049878 A1 | 2/2010 | Yu et al. | |
| 2014/0059278 A1 * | 2/2014 | Schuh ................. | G06F 12/0246 |
| | | | 711/103 |
| 2016/0148948 A1 * | 5/2016 | Kim .................. | H01L 21/76897 |
| | | | 257/324 |
| 2018/0226323 A1 * | 8/2018 | Do .................... | H01L 27/11807 |
| 2019/0182954 A1 * | 6/2019 | Sirajudeen ........... | H05K 7/1084 |
| 2019/0205277 A1 * | 7/2019 | Koh ....................... | H05K 5/026 |
| 2020/0090020 A1 * | 3/2020 | Fujimoto ......... | G06K 19/07733 |

FOREIGN PATENT DOCUMENTS

| | | |
|---|---|---|
| KR | 1020160110978 | 9/2016 |
| WO | 2018225327 | 12/2018 |

OTHER PUBLICATIONS

English language Abstract for KR1020030072334 published Sep. 13, 2003.
English language Abstract for KR1020160110978 published Sep. 23, 2016.
International Search Report and Written Opinion dated Dec. 12, 2019 in International Patent Application No. PCT/US2019/048256.

* cited by examiner

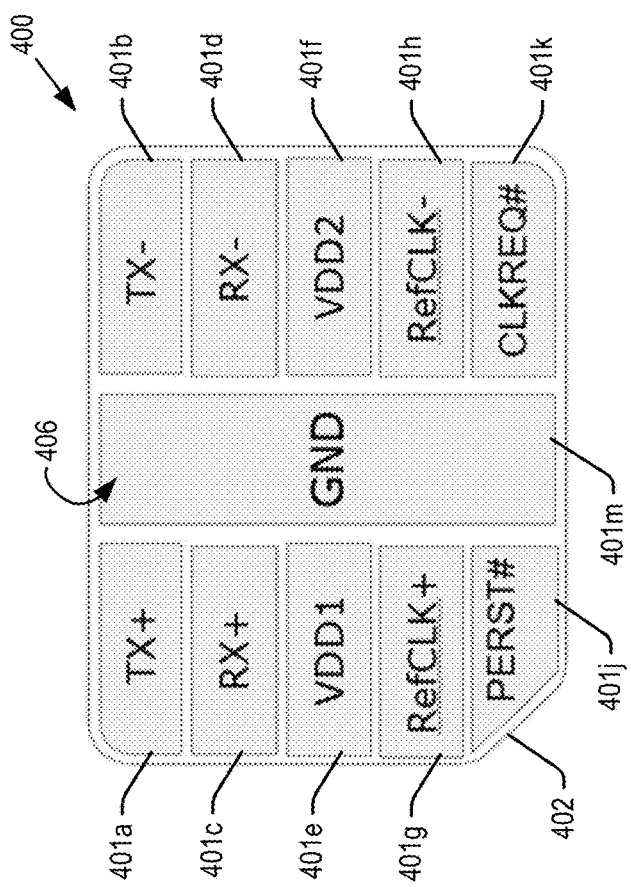
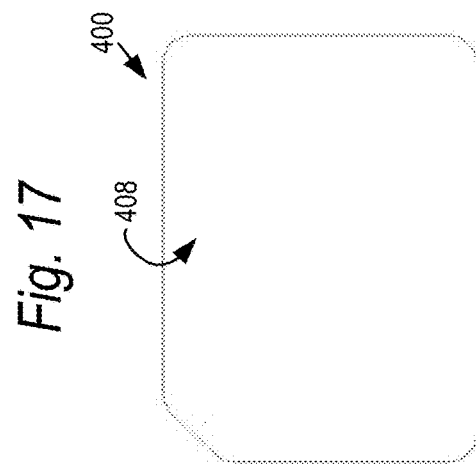
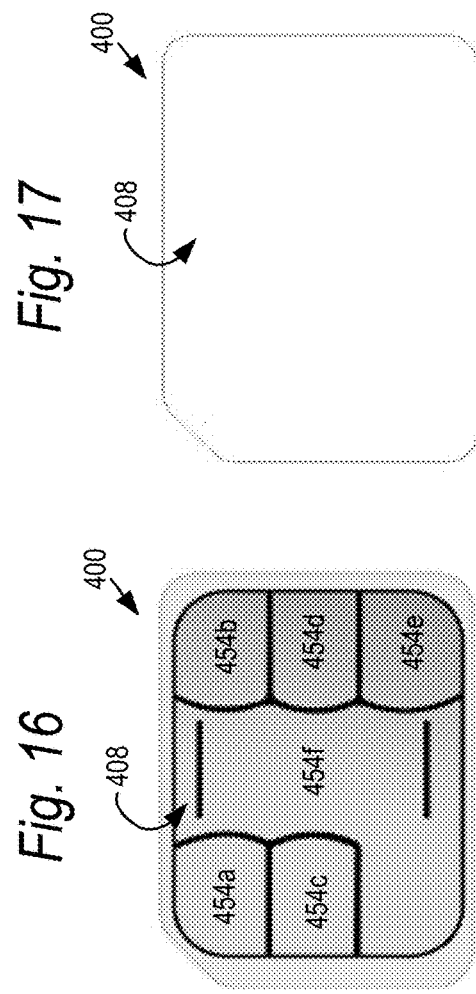
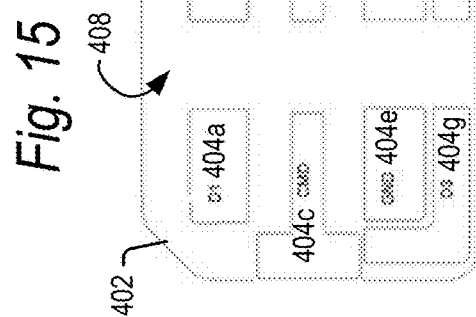

US 11,087,195 B2

MEMORY CARD PAD LAYOUT SUPPORTING MULTIPLE COMMUNICATION PROTOCOLS

PRIORITY CLAIM

This application claims priority to Indian Provisional Patent Application No. 201841049940 filed on Dec. 31, 2018 entitled "MEMORY CARD PAD LAYOUT SUPPORTING MULTIPLE COMMUNICATION PROTOCOLS" and Indian Provisional Patent Application No. 201941002542 filed on Jan. 21, 2019 entitled "MEMORY CARD PAD LAYOUT SUPPORTING MULTIPLE COMMUNICATION PROTOCOLS".

BACKGROUND

For mobile devices such as smartphones, there is a growing demand to use multiple types of cards on a single device. For example, FIG. 1 shows a recently introduced nano Memory Card (NM Card, or nano MMC card hereafter) 10 having a Multimedia Card (MMC) interface includes a pattern of contact pads in positions corresponding to positions of the pads of a nano SIM card. Push-eject card connectors exist with a pair of slots to support different patterns of card installation. For example, a pair of nano SIM cards may be positioned within the card connector and used within a host device card slot. Alternatively, one nano MMC card and one nano SIM card may be positioned within the card connector and used within a host device card slot.

It is further known to configure card connectors and host card slots with openings for horizontal or vertical insertion of memory cards. For example, FIG. 2A shows a conventional card connector 20 configured to receive a pair of memory cards, such as a nano SIM card 22 and a nano MMC card 24 in a horizontal orientation. Once inserted into the card connector 20, the connector and memory cards may be inserted into the slot 26 of a host device 28, such as a mobile telephone. FIG. 2B shows a conventional card connector 30 configured to receive a pair of memory cards, such as a nano SIM card 22 and a nano MMC card 24 in a vertical orientation. Once inserted into the card connector 30, the connector and memory cards may be inserted into the slot 36 of a host device 38, such as a mobile telephone. The host card slot 26 includes a configuration of contact pins that mate with the pads of the SIM card 22 and nano MMC card 24. The host card slot 36 includes a configuration of contact pins that mates with the same pads of the SIM card 22 and nano MMC card 24, rotated 90°.

It is desirable to provide memory cards configured according to other memory card communication standards within the existing nano card form factor. Such cards would work in newly-configured host device card slots, but ideally would also be backward compatible to work in legacy host device card slots, such as the horizontally-oriented card slot 26 and the vertically-oriented card slot 36.

DESCRIPTION OF THE DRAWINGS

FIG. 14 is a view of a top surface of a dual-sided nano memory card according to further embodiments of the present technology.
FIG. 15 is a view of a bottom surface of an embodiment of the dual-sided nano memory card having the top surface shown in FIG. 14.
FIG. 16 is a view of a bottom surface of a further embodiment of the dual-sided nano memory card having the top surface shown in FIG. 14.
FIG. 17 is a view of a bottom surface of another embodiment of the dual-sided nano memory card having the top surface shown in FIG. 14.

DETAILED DESCRIPTION

The present technology will now be described with reference to the figures, which in embodiments, relate to memory cards for example having a nano card form factor configured according to different card standards. The nano cards have patterns of pads allowing for vertical and horizontal insertion to a host device card slot, while being backward compatible with legacy host device card slots. For example, one embodiment relates to a nano SD Express card which adds PCIe express pads to a nano SD card. The resulting card may be inserted horizontally or vertically, and maintains the legacy positions of the nano SD pads to allow backwards compatibility.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top"/"bottom," "upper"/"lower" and "vertical"/"horizontal," and forms thereof, as may be used herein are by way of example and illustrative purposes only, and are not meant to limit the description of the technology in as much as the referenced item can be exchanged in position and orientation. Also, as used herein, the terms "substantially" and/or "about" mean that the specified dimension or parameter may be varied within an acceptable manufacturing tolerance for a given application.

Figure 3:
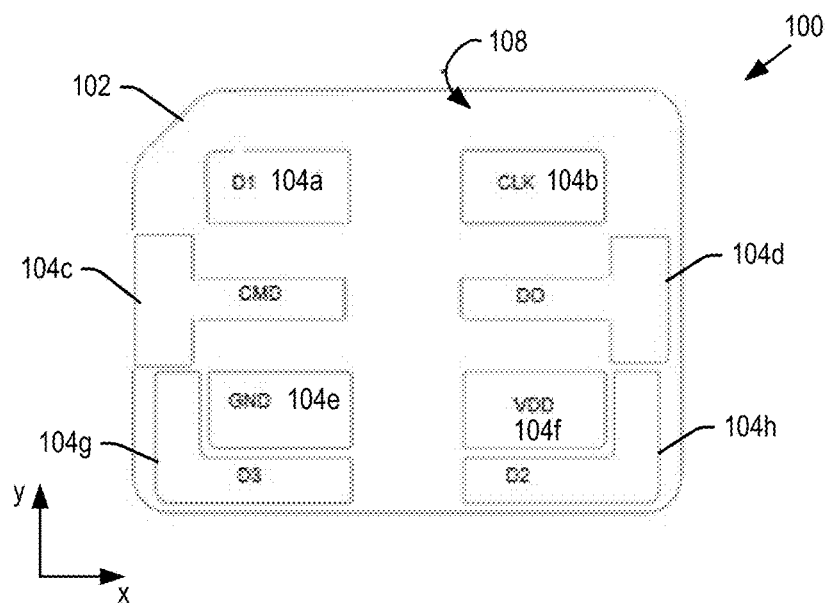
FIG. 3 is a bottom view of a nano SD card according to an embodiment of the present technology.

FIG. 3 is a view of a bottom side 108 of a nano SD card 100 according to the present technology. As noted, "bottom" and "top" are relative terms, and side 108 may be a top side of card 100 (and cards 200 and 300 described below) in further embodiments. The card 100 may have opposed planar surfaces (meaning at least a portion of the surfaces are planar) conforming to the nano SIM card form factor. This form factor may include a length of 12.3 mm and a width of 8.8 mm to the planar surfaces and a thickness of up to a full size SIM card of 0.84 mm. Other sizes are contemplated in further embodiments. The card 100 may include a corner chamfer 102 as in conventional nano SIM cards to define the orientation for insertion into a host device card slot. The memory cards described below (including cards 100, 200, 300 and 400) include pads on at least one of the planar surfaces (meaning the pads are either on bottom of at least one of the planar surfaces, or slightly recessed into at least one planar surface of the card).

In embodiments, the host device may be a mobile phone. However, the host device may be a variety of other devices in further embodiments, including a desktop computer, a laptop computer, a tablet, a camera, an IoT device, a memory storage adapter or other application devices such as automotive or components of application devices that make a use of a memory card or a SIM card.

As in conventional SD cards, nano SD card 100 may include eight interface pads 104a-104h (collectively pads 104), comprising data lines D0-D3, clock CLK, command/response line CMD, power supply VDD and ground GND, each numbered as shown. In accordance with embodiments of the present technology, the interface pads 104 are positioned on side 108 of card 100 with a shape and layout that provide at least two advantages. First, the shape and position of the pads 104 allow the nano SD card 100 to be inserted and used within a host device configured for either horizontal or vertical card insertion.

Figure 4:
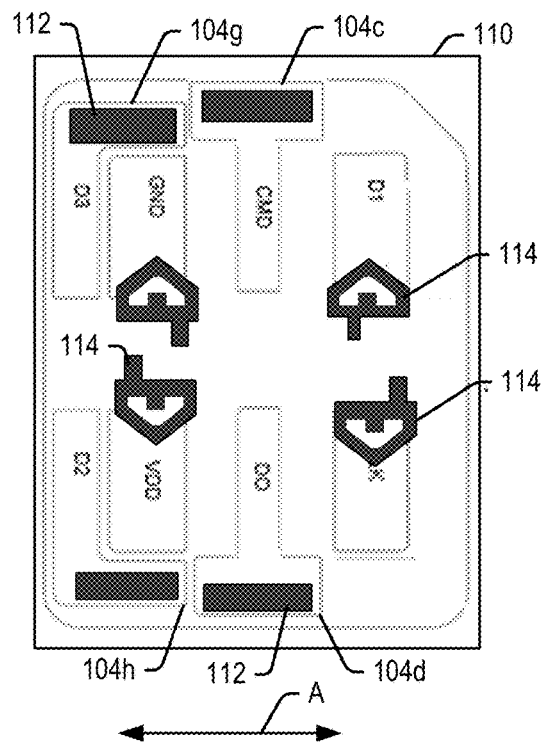
FIG. 4 is a bottom view of the nano SD card of FIG. 3 inserted horizontally within a host device card slot.
Figure 5:
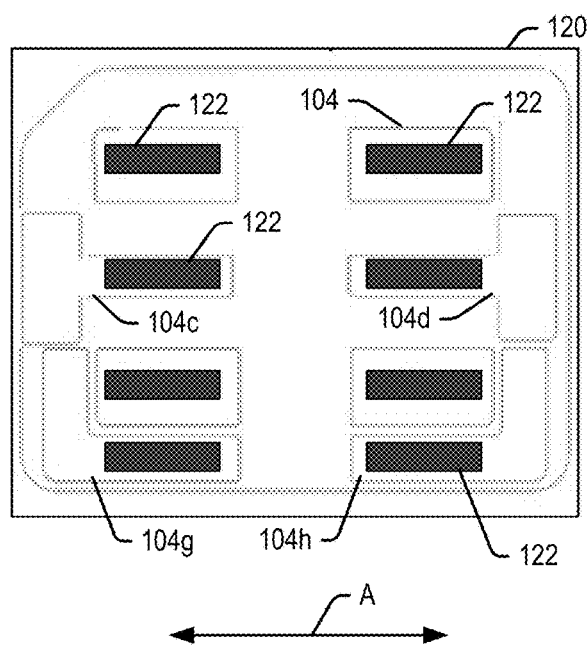
FIG. 5 is a bottom view of the nano SD card of FIG. 3 inserted vertically within a host device card slot.

For example, FIG. 4 shows a bottom view of the card 100 inserted horizontally in the direction of arrow A into a host device card slot 110. The card slot 110 comprises a pattern of contact pins 112 and 114 configured to mate with the respective pads 104 of the horizontally inserted nano SD card 100. FIG. 5 shows a bottom view of the card 100 inserted vertically in the direction of arrow A into a host device card slot 120. The card slot 120 comprises a pattern of contact pins 122 configured to mate with the respective pads 104 of the vertically inserted nano SD card 100.

In order to enable contact with the pins 112, 114 in the horizontal orientation and pins 122 in the vertical orientation, pads 104c and 104d are shaped like sideways "T"s, with a first portion aligned along the x-axis (from the view of FIG. 3) and a second portion aligned along the y-axis (from the view of FIG. 3). The pair of pads 104c, 104d are oriented so as to be mirror images of each other. A second pair of pads 104g and 104h are shaped like sideways "L"s, with a first portion aligned along the x-axis (FIG. 3) and a second portion aligned along the y-axis (FIG. 3). The pair of pads 104g, 104h are oriented so as to be mirror images of each other.

The reason of having "T" shape pads is to allow narrow pads, with minimal overall surface area, with vertical and horizontal portions while keeping the center location of the given functional pad, so as to be compatible with earlier hosts (i.e., nano MMC) and allowing further space for another set of pads (mirrored to 104g and 104h) for another interface addition, as described hereinafter.

When inserted horizontally into host device card slot 110 as shown in FIG. 4, respective pins 112, 114 contact the second portions (aligned along the y-axis in FIG. 3) of the pads 104c, 104d, 104g and 104h. Conversely, when inserted vertically into host device card slot 120 as shown in FIG. 5, respective pins 122 contact the first portions (aligned along the x-axis in FIG. 3) of the pads 104c, 104d, 104g and 104h.

A further advantage of the shape and layout of the interface pads 104 of nano SD card 100 is that they pads 104 are backward compatible with host device card slots configured for other communication standards. For example, the shape and layout of pads 104 allow the nano SD card 100 to be used in a host device card slot configured to receive horizontal or vertical nano SIM cards. The nano SD card 100 may be backward compatible with cards slots configured for other standards in further embodiments, including for example the MMC card standard.

Figure 6:
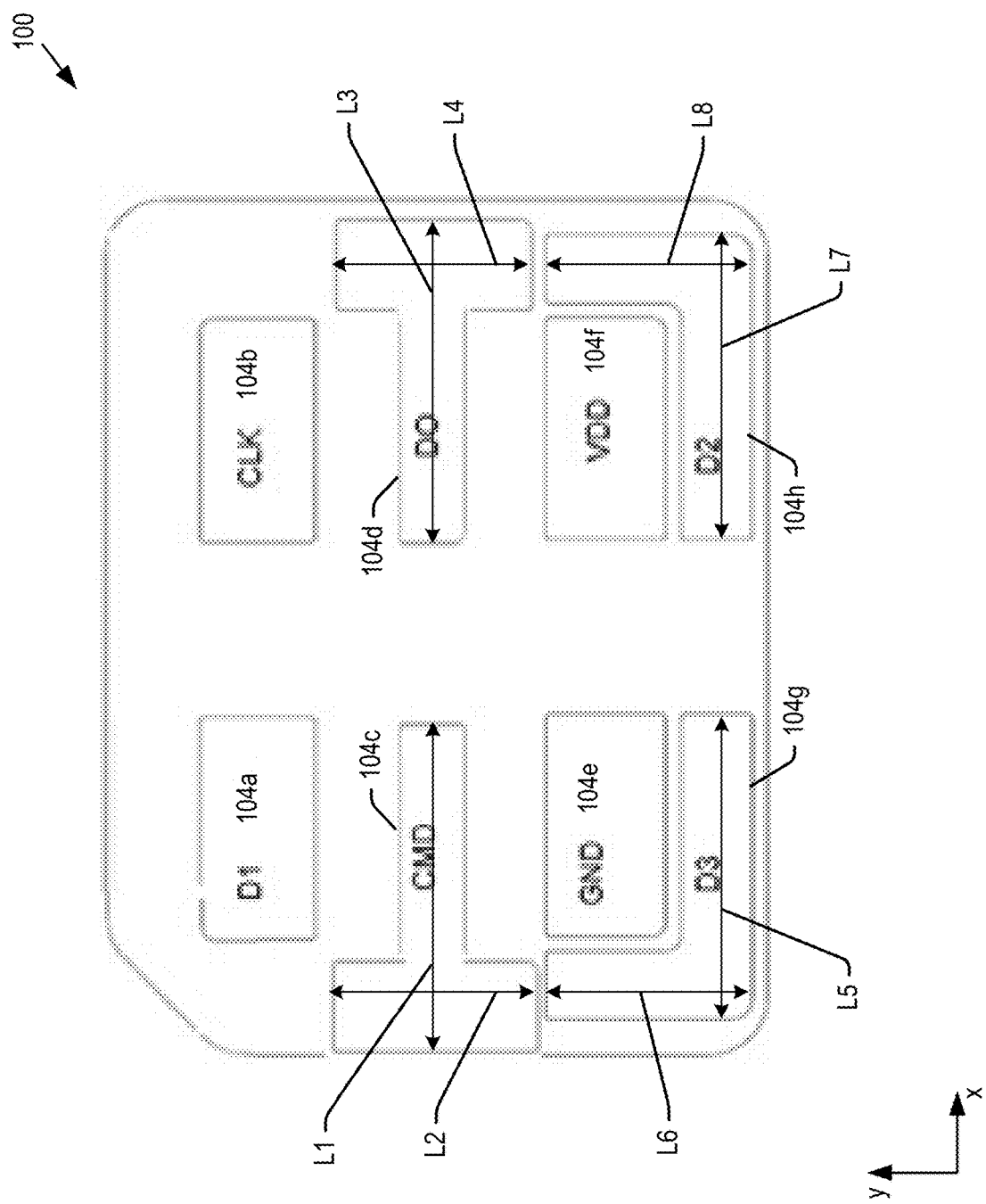
FIG. 6 is a bottom view showing the dimensions of the pads of the nano SD card of FIG. 3.

The pads 104a-104h of nano SD card 100 may have the positions and layouts as shown in FIG. 3 relative to an outer perimeter of the card 100. Examples of the dimensions of pads 104 of nano SD card 100 will now be set forth with respect to the view of the bottom surface of card 100 shown in FIG. 6. The D1 and CLK pads 104a and 104b may have a length of 3.31 mm and a width of 1.33 mm. The CMD pad 104c may have a length, L1, of 4.66 mm and a length, L2, of 2.58 mm. The width of the first (x-axis aligned) portion of the pad 104c may be 0.87 mm and the width of the second (y-axis aligned) portion of the pad 104c may be 1.27 mm. The D0 pad 104d may have lengths L3 and L4 with the same dimensions as lengths L1 and L2 of pad 104c, respectively. The width of the second portion (y-axis aligned in FIG. 3) of pad 104c may be wider than the second portion (y-axis aligned in FIG. 3) of pad 104g, and the same for second portion of pad 104d relative to the second portion of pad 104h. In both cases, it is done to allow flexibility of the placement of the long fingers of pins 112, which are not necessarily aligned one after the other.

The GND pad 104e may have a length of 3.31 mm and a width of 1.60 mm. The VDD pad 104f may have the same length and width as pad 104e. The D3 pad 104g may have a length, L5, of 4.38 mm and a length, L6, of 2.75 mm. The width of the first (x-axis aligned) portion of the pad 104g may be 0.95 mm and the width of the second (y-axis aligned) portion of the pad 104g may be 1.00 mm. The D2 pad 104h may have lengths L7 and L8 with the same dimensions as lengths L5 and L6 of pad 104g, respectively.

It is understood that each of the above-identified dimensions of pads 104a-104h may vary by design or within engineering tolerances in further embodiments.

The side 108 of card 100 shown in FIG. 3 may alternatively have a pattern of pads configured per the MMC standard. Such a nano MMC card would work with other card slots including nano SD card slots 110, 120, 210 and 220 (explained below).

FIGS. 7-10 show a further embodiment of the present technology which relates to a nano SD Express card 200. The card 200 adds PCIe pads to the above-described nano SD card 100, while still allowing the card to be inserted horizontally or vertically. The card 200 also maintains existing positions of the nano SD pads to allow backwards compatibility with SD and other card slots.

Figure 7:
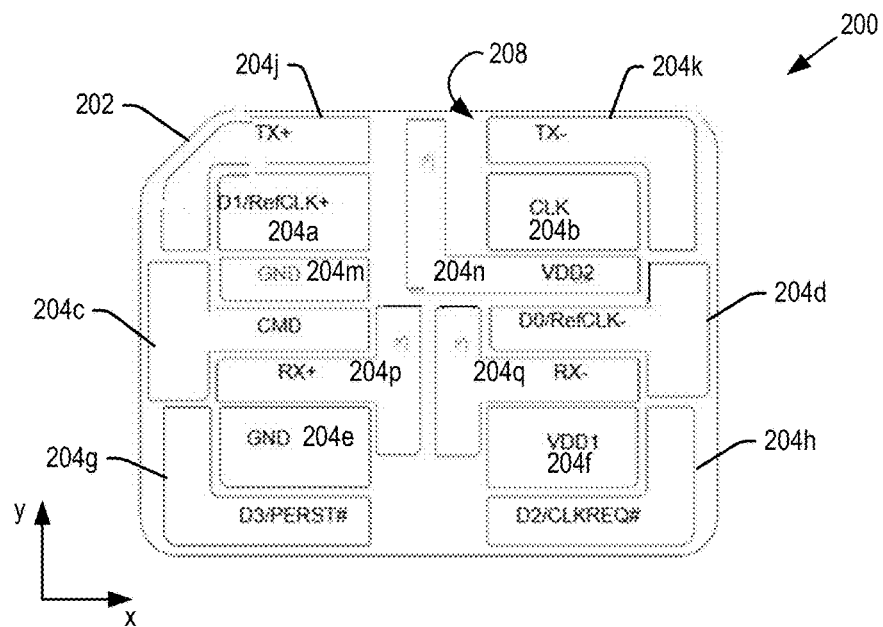
FIG. 7 is a bottom view of a nano SD Express card according to an embodiment of the present technology.

FIG. 7 is a view of a bottom side view of nano SD Express card 200, which may have the same form factor as a nano SIM card and the nano SD card 100, with a length of 12.3 mm and a width of 8.8 mm. Other sizes are contemplated in further embodiments. The card 200 may include a corner chamfer 202 as in conventional nano SIM cards to define the orientation for insertion into a host device card slot. The nano SD Express card 200 may include fourteen interface pads, numbered 204a-204q (collectively pads 204), configured with both the SD and PCI Express (PCIe) bus interfaces in which some of the signals of both interfaces share the same pads and some are separated, similarly as defined for SD Express cards.

The pads 204 may comprise eight interface pads 204a-204h configured according to the SD standard. These pads 204a-204h may comprise data lines D0-D3, clock CLK, command/response line CMD, power supply VDD and ground GND numbered as shown. The pads may have the same positions, layout and dimensions, and at least the same functionality, as the pads 104a-104h of the nano SD card 100 shown and described with respect to FIGS. 3-6 above. As such, the nano SD Express card 200 may be backward compatible with vertical and horizontal card slots 110, 120 configured per the nano SD card standard and vice versa (card 100 may be inserted and used in hosts 210 and 220).

The pads 204 may further comprise additional pads and functionality in accordance with the PCIe expansion bus standard. For example, SD data pads D0 and D1 may be used as the PCIe differential reference clock pads REFCLK+ and REFCLK− to assist the synchronization of the card's PCIe interface timing circuits. The SD data pad D2 may be used as the PCIe clock request pad CLKREQ# and the SD data pad D3 may be used as the PCIe pad PERST#, both are side band signaling as used by PCIe specifications. The above mentioned signaling sharing between the SD protocol and the PCIe protocol may be done in the same way as defined for existing SD Express cards. The pads 204 further include a pair of transmission line pads TX+ and TX−, a pair of receiving line pads RX+ and RX−, an additional voltage source line VDD2, and an optional additional ground pad GND.

In accordance with embodiments of the present technology, the interface pads 204 are provided with a shape and layout that allow for several advantages. First, the nano SD Express card 200 is backward compatible with host device card slots configured according to other communication standards. For example, as noted above, by including pads with the same shape, layout and functionality as nano SD card 100, the nano SD Express card 200 is backward compatible with card slots configured per the nano SD card standard and vice-versa.

Figure 8:
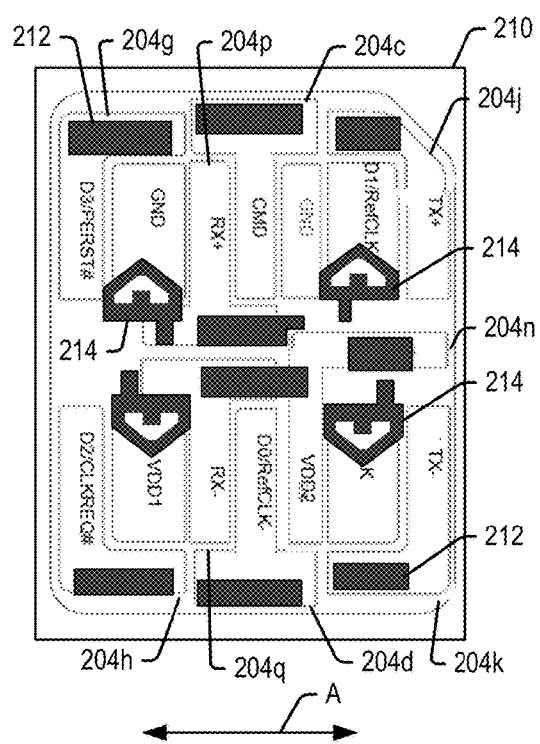
FIG. 8 is a bottom view of the nano SD Express card of FIG. 7 inserted horizontally within a host device card slot.
Figure 9:
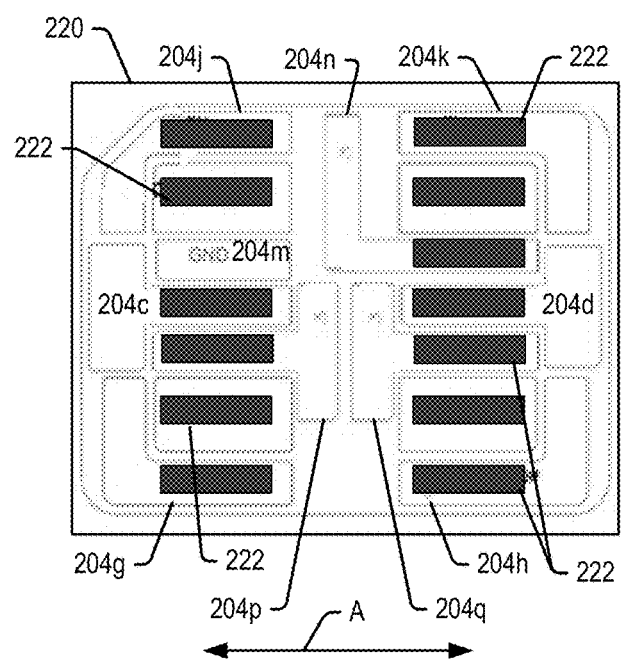
FIG. 9 is a bottom view of the nano SD Express card of FIG. 7 inserted vertically within a host device card slot.
Figure 10:
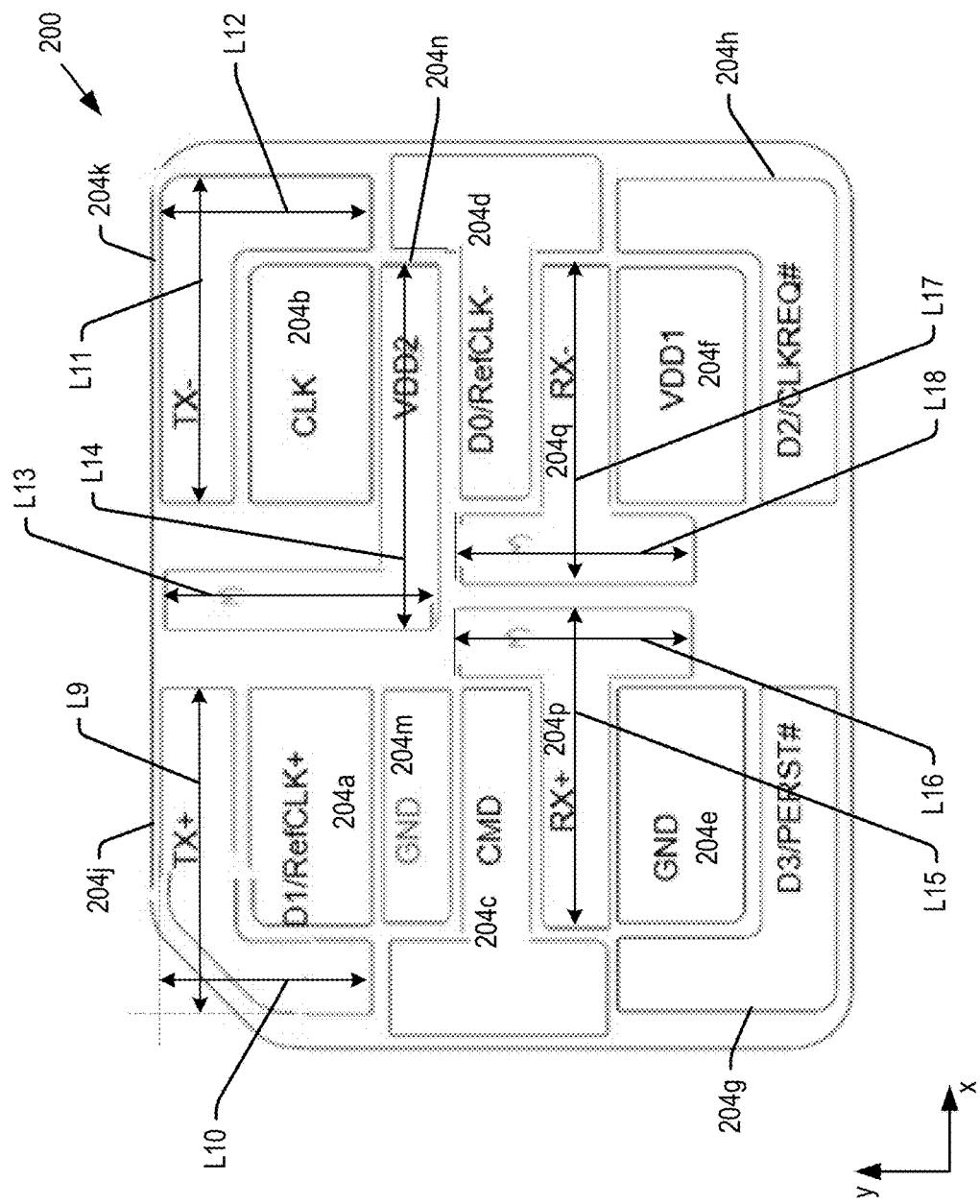
FIG. 10 is a bottom view showing the dimensions of the pads of the nano SD Express card of FIG. 7.

Second, the shape and position of the pads 204 allow the nano SD Express card 200 to be inserted and used within a host device configured for either horizontal or vertical card insertion. For example, FIG. 8 shows a bottom view of the card 200 inserted horizontally in the direction of arrow A into a host device card slot 210. The card slot 210 comprises a pattern of contact pins 212, 214 configured to mate with the respective pads 204 of the horizontally inserted nano SD Express card 200. FIG. 9 shows a bottom view of the card 200 inserted vertically in the direction of arrow A into a host device card slot 220. The card slot 220 comprises a pattern of contact pins 222 configured to mate with the respective pads 204 of the vertically inserted nano SD Express card 200. (While certain contact pins 212, 214, 222 in FIGS. 8 and 9 appear to contact multiple pads, the contact pins are angled downward (into the page of the figures), so that only the tips of the contact pins 212, 214, 222 contact their associated pad 204).

In order to enable contact with the pins 212 in the horizontal orientation and pins 222 in the vertical orientation, a number of pads 204 are provided with right angle portions aligned along the x- and y-axes. The pads 204c, 204d, 204g and 204h have first and second portions aligned with the x-axis and y-axis, respectively, in FIG. 7 as described above with respect to nano SD card 100. Additionally, the pads 204j, 204k and 204n are shaped like "L"s with a first portion aligned with the x-axis (FIG. 7) and a second portion aligned with the y-axis. The pair of pads 204j and 204k are mirror images of each other, with a portion of pad 204j removed near chamfer 202. A pair of pads 204p and 204q are shaped like sideways "T"s, being mirror images of each other, with a first portion aligned along the x-axis (FIG. 7) and a second portion aligned along the y-axis.

As noted above, the "T" shape pads allow narrow pads, with minimal overall surface area, having vertical and horizontal portions for horizontal and vertical insertion. Additionally, the narrow portions of the "T" shape pads allow other pads to be positioned within the corners defined by the first and second portions. For example, FIG. 7 shows "T"-shaped pad 204c with first and second portions that define corners that receive pad 204m and a portion of pad 204p (itself also "T"-shaped and having a corner receiving a portion of pad 204c). Thus, the narrow portions enable flexibility for both horizontal and vertical insertion, while having minimal over surface area to enable flexibility in the positioning of other pads. Furthermore, a portion of the "T" and/or "L" shape pads may maintain a location of the corresponding pad of legacy cards, so as to be compatible with earlier hosts (e.g., nano MMC).

When inserted horizontally into host device card slot 210 as shown in FIG. 8, respective pins 212 contact the first portions (aligned along the y-axis in FIG. 7) of the pads 204c, 204d, 204g, 204h, 204j, 204k, 204n, 204p and 204q. Conversely, when inserted vertically into host device card slot 220 as shown in FIG. 9, respective pins 222 contact the second portions (aligned along the x-axis in FIG. 7) of the pads 204c, 204d, 204g, 204h, 204j, 204k, 204n, 204p and 204q. In embodiments, a contact pin 222 may be omitted over GND pad 204m in the horizontal and/or vertical implementations, though a contact pin may be provided for pad 204m in the horizontal and/or vertical implementations in further embodiments.

The pads 204a-204q of nano SD Express card 200 may have the positions and layouts as shown in FIG. 7 relative to an outer perimeter of the card 200. Examples of the dimensions of pads 204 of nano SD Express card 200 will now be set forth with respect to the view of the bottom surface of card 200 shown in FIG. 10. The pads 204a-204h have the same positions, layouts and dimensions as pads 104a-104h described above. The TX+ pad 204j has a 45° corner omitted given its position adjacent chamfer 202. If the corner were not omitted, the TX+ pad 204j may have a length, L9, of 4.38 mm and a length, L10, of 2.60 mm. The width of the first (x-axis aligned) portion of the pad 204j may be 1.12 mm and the width of the second (y-axis aligned) portion of the pad 204j may be 1.00 mm. The TX− pad 204k may have lengths L11 and L12 with the same dimensions as lengths L9 and L10 of pad 204j, respectively (with the change that the corner of the pad 204k is not omitted). The width and shapes of 204j and 204k may be the same as pads 204g and 204h (and the same as 104g and 104h in card 100) except for the cut corner due to the chamfer 202.

The GND pad 204m may have a length of 3.31 mm and a width of 0.76 mm. The VDD2 pad 204n may have a length, L13, of 3.53 mm and a length, L14, of 4.94 mm. The width of the first (x-axis aligned) portion of the pad 204n may be 0.76 mm and the width of the second (y-axis aligned) portion of the pad 204n may be 0.76 mm.

RX− pad 204p may have a length, L15, of 4.31 mm and a length, L16, of 2.89 mm. The width of the first (x-axis aligned) portion of the pad 204p may be 1.00 mm and the width of the second (y-axis aligned) portion of the pad 204p may be 0.85 mm. The RX− pad 204q may have lengths L17 and L18 with the same dimensions as lengths L15 and L16 of pad 204p, respectively.

The pads 204a-204q may have a minimum spacing of for example 0.2 mm from its neighboring pad and edges of the card 200. It is understood that each of the above-identified dimensions of pads 204a-204q, and the minimum spacing around them, may vary by design or within engineering tolerances in further embodiments.

Figure 11:
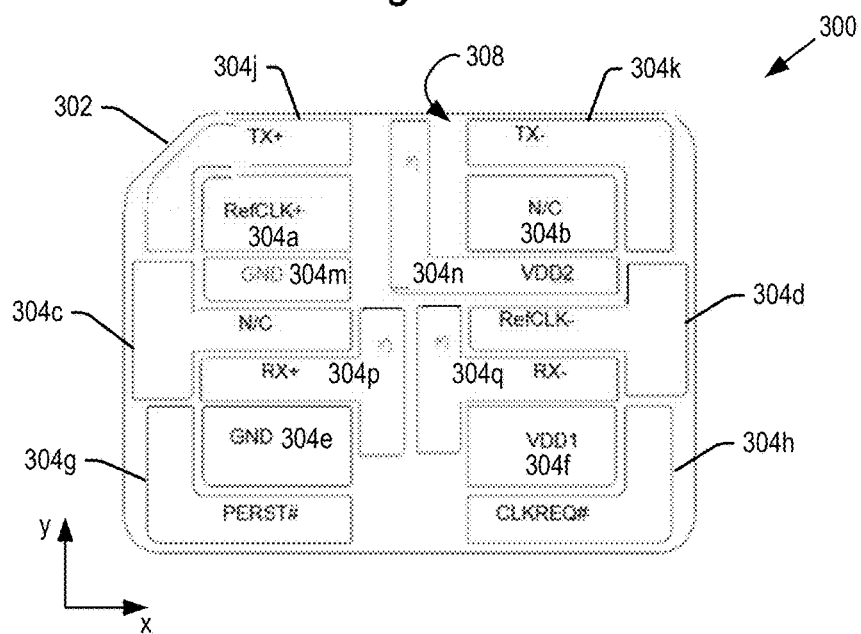
FIG. 11 is a bottom of a nano Express card according to an embodiment of the present technology.

FIG. 11 is a view of a bottom side 308 of a further embodiment of the present technology comprising a nano Express card 300. The nano Express card 300 is a memory card configured to operate according to the PCIe bus standard. The card 300 may have the same form factor as the nano cards 100 and 200 described above, with a length of 12.3 mm and a width of 8.8 mm. Other sizes are contemplated in further embodiments. The card 300 may include a corner chamfer 302 as in conventional nano SIM cards to define the orientation for insertion into a host device card slot.

The nano SD Express card 300 may include fourteen interface pads, numbered 304a-304q (collectively pads 304). Each of the pads 304 may have the same size, position and layout as one of the pads 204, with corresponding pads incremented by 100 in FIG. 11. The pads 304 may have the same PCIe functionality as the pads 204, but not the SD standard functionality. As such, some pads such as pads 304b and 304c, need not be connected to circuitry within the card 300.

The nano Express card 300 may be compatible with host device card slots configured according to other communication standards. For example, by including pads with the same shape, layout and functionality as nano SD card 100 and the nano SD Express card 200, the nano Express card 300 may be used within card slots configured per the nano SD and nano SD Express card standard. The nano SD Express card 200 may also be used within card slots configured for use with the nano Express card 300.

Figure 12:
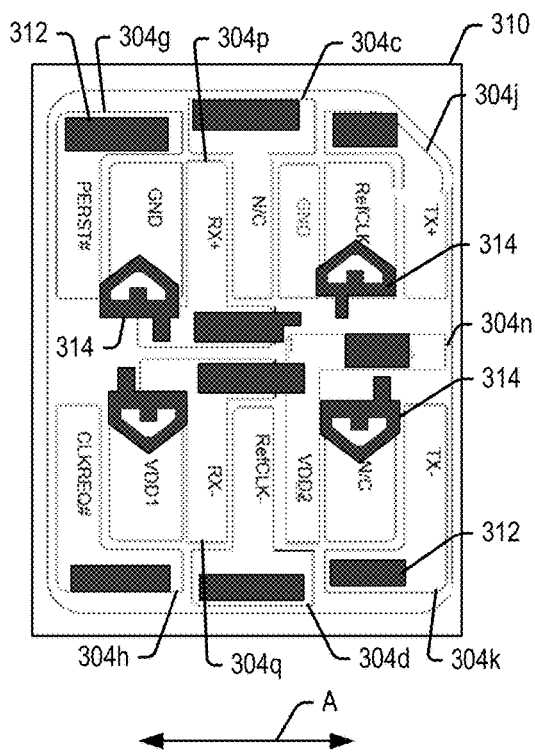
FIG. 12 is a bottom view of the nano Express card of FIG. 11 inserted horizontally within a host device card slot.
Figure 13:
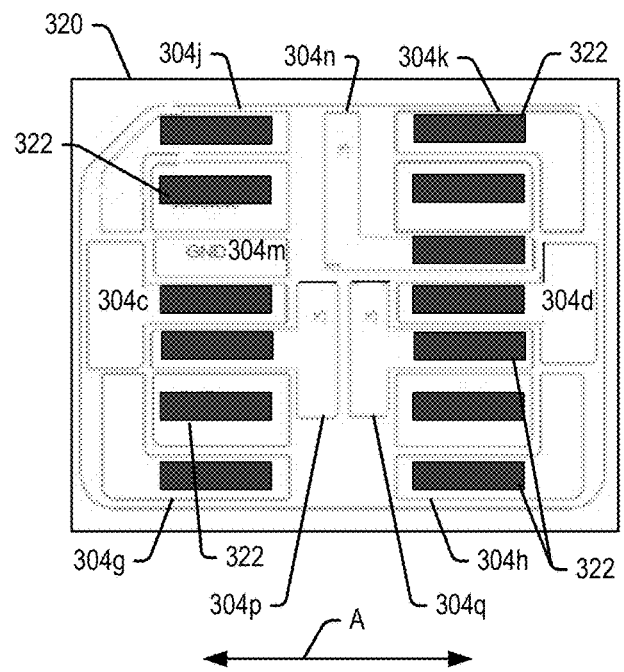
FIG. 13 is a bottom view of the nano Express card of FIG. 11 inserted vertically within a host device card slot.

Moreover, as with the nano SD Express card 200, the shape and position of the pads 304 allow the nano Express card 300 to be inserted and used within a host device configured for either vertical or horizontal card insertion. As above, several of the pads 304 have right angle portions aligned along both the x- and y-axes. These features enable the card 300 to be used in both horizontal and vertical orientations. For example, FIG. 12 shows a bottom view of the card 300 inserted horizontally in the direction of arrow A into a host device card slot 310. The card slot 310 comprises a pattern of contact pins 312, 314 configured to mate with the respective pads 304 of the horizontally inserted nano Express card 300. FIG. 13 shows a bottom view of the card 300 inserted vertically in the direction of arrow A into a host device card slot 320. The card slot 320 comprises a pattern of contact pins 322 configured to mate with the respective pads 304 of the vertically inserted nano Express card 300. (As above, while certain contact pins 312, 314, 322 in FIGS. 12 and 13 appear to contact multiple pads, the contact pins are angled downward (into the page of the figures), so that only the tips of the contact pins 312, 314, 322 contact their associated pad 304).

In embodiments described above, memory cards 100, 200 and 300 have been described with a nano card form factor and a configuration of pads on a bottom side of the cards which make those cards compatible with multiple communication standards. In accordance with further embodiments of the present technology, these objectives may be accomplished by providing pads on both the top and bottom sides of the memory card, with the pads on different sides configured to operate according to different communications standards. Such embodiments will now be described with reference to FIGS. 14-17.

FIG. 14 shows a topside 406 of a dual-sided memory card 400 including a pattern of pads 401a-401m (collectively pads 401) configured per the nano Express standard with functionalities according to the PCIe Express memory card bus standard as described above. Each of the pads 401 may have a rectangular footprint, with TX+/−, RX+/−, VDD1, VDD2, REFCLK+/−, PERST# and CLKREQ# pads arranged down opposed edges of the card 400, and an enlarged GND pad down a center of the card 400. In a further embodiment, the pads 401 may have shapes and layouts as in nano Express card 300 so that the card 400 may be used in host card slots configured for vertical or horizontal insertion. Note that the width of the illustrated pads allows vertical and horizontal insertion as well, using a full set of triangle type of connector pads (e.g., pins 114, 214, 314) for both directions, or triangle for all pads in horizontal type insertion connector and long finger connector pins 112, 212, 312 for vertical insertion connectors.

FIGS. 15-17 show different embodiments of the bottom side 408 of the card 400. As noted above, sides 406 and 408 may be bottom and top sides in further embodiments. In FIG. 15, the side 408 may have a pattern of pads 404a-404h configured per the nano SD standard shown and described above with respect to FIG. 3. Like pins from FIG. 3 are incremented by 300 in FIG. 15. Such an embodiment provides a nano Express card (FIG. 14), with a nano SD interface on other side (FIG. 15). Thus, the dual-sided card 400 in accordance with FIGS. 14 and 15 may have two functionalities on same card—one functionality on the top side and another functionality on the bottom side.

In use, the card 400 having the interfaces of FIGS. 14 and 15 may be used in a host device card slot configured according to either the Express card standard or the SD standard. Where the host device card slot is configured per the Express card standard, the card 400 may be inserted with the side 406 facing downward (or facing the side of the card slot including the connector pins). Where the host device card slot is configured per the SD card standard, the card 400 may be inserted with the side 408 facing downward (or facing the side of the card slot including the connector pins).

In use, the card 400 having the interfaces of FIGS. 14 and 15 may be used in a host device card slot configured to support both—the Express card standard and the nano SD standard (or nano MMC). Such host device will have a connector with connector pins at the top side and at the bottom side. The host device card slot may be configured in top side to support the Express card standard and the bottom side to support the nano SD card (or nano MMC). The card 400 may be inserted with the side 406 facing upwards and the nano SD side 408 of FIG. 15, facing downwards. In such a way, a single card will provide to the host dual functionality with capability to be operated at the same time in a single slot.

The card 400 combining the pads 401a-400m of FIG. 14 on one side and the pads 404a-404h of FIG. 15 on the other side would also be backward compatible with other card standards. Additionally, the side 408 of card 400 may alternatively have a pattern of pads configured per the MMC standard and function as the nano MMC card. Such a card would work within Express card slots (using the side 406), and SD or MMC card slots (using the side 408).

In FIG. 16, the side 408 may have a pattern of pads 454a-454f configured per the nano SIM standard. Such an embodiment provides a nano Express card (FIG. 14) side 406, with a nano SIM interface on the opposite side 408 (FIG. 16), thus providing two functionalities on same card. The SIM pads shown in FIG. 16 are one example of specific SIM pads. Similar SIM functionality may be implemented in various patterns, as commonly done for various nano SIM cards.

In use, the card 400 having the interfaces of FIGS. 14 and 16 may be used in a host device card slot configured according to either the Express card standard or the nano SIM standard. Where the host device card slot is configured per the Express card standard, the card 400 may be inserted with the side 406 facing downward (or facing the side of the card slot including the connector pins). Where the host device card slot is configured per the nano SIM card standard, the card 400 may be inserted with the side 408 facing downward (or facing the side of the card slot including the connector pins).

In use, the card 400 having the interfaces of FIGS. 14 and 16 may be used in a host device card slot configured to support both the Express card standard and the nano SIM standard. Such host device will have a connector with connector pins at the top side and at the bottom side. The host device card slot may be configured in top side to support the Express card standard and the bottom side to support the nano SIM card. The dual-sided card 400 may be inserted with the side 406 facing upwards and the nano SIM side 408, of FIG. 16, facing downwards. In such a way, a single card will provide to the host dual functionality with capability to be operated at the same time in a single slot.

FIG. 17 shows a further embodiment where the top side 406 of the card has no pads. Such an embodiment provides a nano Express card combining the pads from FIG. 14 with the blank surface of FIG. 17.

The cards 400 of FIGS. 14-17 provide advantages such as allowing for more space and optimized pad locations. The cards 400 also avoid conflicts and interoperability issues with combining different standards on a single side of a card. The cards 400 also allow for transition from existing nano SD solutions to nano Express, where one side will have the nano SD pads and the other side the nano Express pads.

Figure 18:
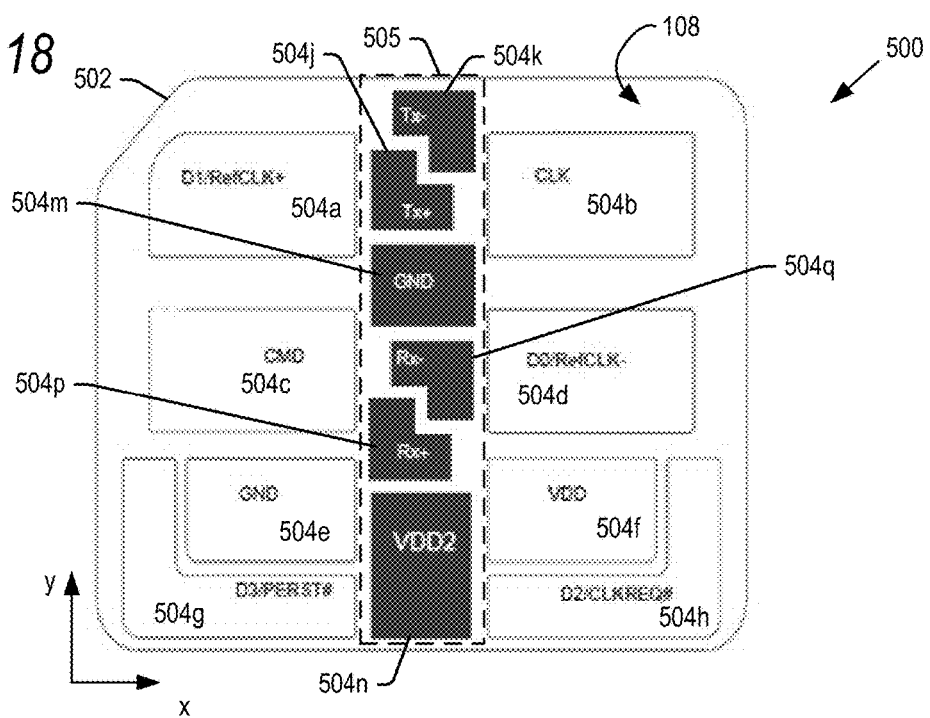
FIG. 18 is a bottom view of a nano SD Express card according to a further embodiment of the present technology.
Figure 19:
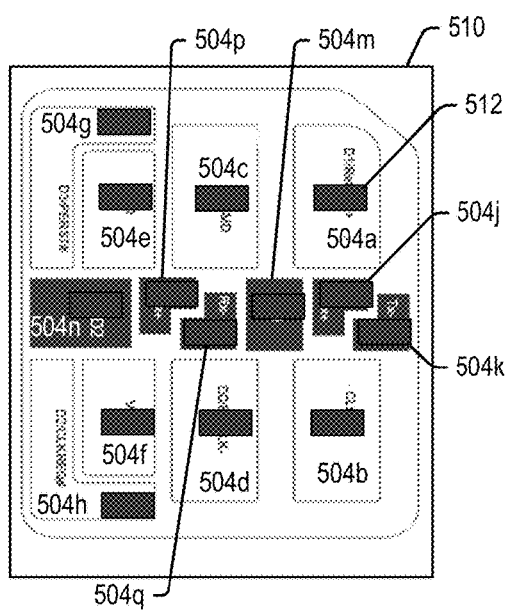
FIG. 19 is a bottom view of the nano SD Express card of FIG. 18 inserted horizontally within a host device card slot.
Figure 20:
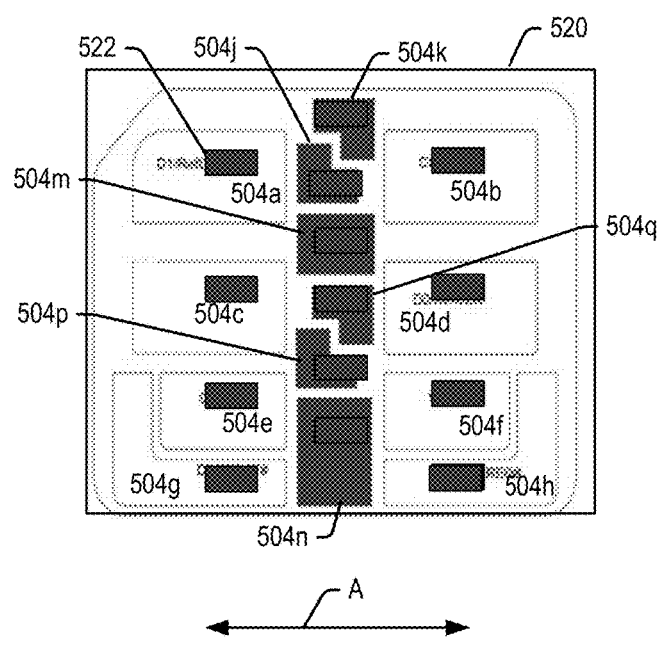
FIG. 20 is a bottom view of the nano SD Express card of FIG. 18 inserted vertically within a host device card slot.

FIGS. 18-20 illustrate a further embodiment of the present technology which relates to a nano SD Express card 500. The card 500 adds PCIe pads to the above-described conventional nano card 10, while still allowing the card to be inserted horizontally or vertically. The card 500 also maintains existing positions of the nano MMC pads to allow backwards compatibility with MMC, SD and other card slots, as explained below.

FIG. 18 is a view of a bottom side view of nano SD Express card 500, which may have the same form factor as a nano SIM card and the nano SD card 100, with a length of 12.3 mm and a width of 8.8 mm. Other sizes are contemplated in further embodiments. The card 500 may include a corner chamfer 502 as in conventional nano SIM cards to define the orientation for insertion into a host device card slot. The nano SD Express card 500 may include fourteen interface pads, numbered 504a-504q (collectively pads 504), configured with both the SD and PCI Express (PCIe) bus interfaces in which some of the signals of both interfaces share the same pads and some are separated, similarly as defined for SD Express cards.

The pads 504 may comprise eight interface pads 504a-504h configured according to the SD standard as described above. The pads may have the same positions, layout and dimensions, and at least the same functionality, as the pads 104a-104h of the nano SD card 100 shown and described with respect to FIGS. 3-6 above. As such, the nano SD Express card 500 may be backward compatible with vertical and horizontal card slots 110, 120 configured per the nano SD card standard and vice versa (card 100 may be inserted and used in host slots 510 and 520).

The pads 504 may further comprise additional pads and functionality in accordance with the PCIe expansion bus standard. As described above, such pins may include for example sharing of some pads between the MMC/SD standards and the PCIe standard. These pads may include the reference clock pads REFCLK+ and REFCLK− (504a, 504d), clock request pad CLKREQ# (504h), and PCIe pad PERST# (504g). In accordance with this embodiment, other PCIe pads may be provided in a central portion 505 of the card 500, in between the two rows of SD interface pads 405a-504h. These pads include a pair of transmission line pads TX+ and TX− (504j, 504k), a pair of receiving line pads RX+ and RX− (504p, 504q), an additional voltage source line VDD2 (504n), and an optional additional ground pad GND (504m). The PCIe interface pads may function as described above.

In accordance with embodiments of the present technology, the interface pads 504 are provided with a shape and layout that allow for several advantages. First, the provision of the SD/MMC pads 504*a*-504*h* together with the PCIe pads in the central portion 505 allows the nano SD Express card 500 to be backward compatible with host device card slots configured according to other communication standards. For example, as noted above, by including pads with the same shape, layout and functionality as nano memory card 10, the nano SD Express card 500 is backward compatible with card slots configured per the nano card 10, and vice-versa, as explained below.

Second, the shape and position of the pads 504 allow the nano SD Express card 500 to be inserted and used within a host device configured for either horizontal or vertical card insertion. For example, FIG. 19 shows a bottom view of the card 500 inserted horizontally in the direction of arrow A into a host device card slot 510. The card slot 510 comprises a pattern of contact pins 512 (one of which is numbered) configured to mate with the respective pads 504 of the horizontally inserted nano SD Express card 500. FIG. 20 shows a bottom view of the card 500 inserted vertically in the direction of arrow A into a host device card slot 520. The card slot 520 comprises a pattern of contact pins 522 (again, one of which is numbered) configured to mate with the respective pads 504 of the vertically inserted nano SD Express card 500.

In order to enable contact with the pins 512 in the horizontal orientation and pins 522 in the vertical orientation, a number of pads 504 are provided with right angle portions aligned along the x- and y-axes. For example, in the central portion 505 of the card 500, pads 504*j* and 504*k*, and pads 504*p* and 504*q*, are formed with "L"-shaped first and second portions aligned with the x-axis and y-axis. The pads 504*j* and 504*k* may be inverted relative to each other, and fit together as shown in FIG. 18, to provide a minimum overall footprint of the two pads together. The same is true of pads 504*p* and 504*q*. This design of pads 504*j*, 504*k*, 504*p* and 504*q* including first and second right angle portions fitting together with each other provides flexibility by enabling both horizontal and vertical insertion, and also takes up a minimum footprint to enable flexibility in the positioning of other pads in the central portion 505 of the card 500. Other pads 504 may be provided with an "L"-shape or a "T"-shape, within or outside of the central portion 505, in further embodiments.

Moreover, forming the pads with an "L"-shape as opposed to a complete quadrangle reduces the amount of material in the pads, thereby reducing a capacitance of the "L" shaped pads. This may also be true of the "T"-shaped pads described above. This is beneficial to the high frequency transmissions used in the PCIe interface.

When inserted horizontally into host device card slot 510 as shown in FIG. 19, respective pins 512 contact the first portions (aligned along the y-axis in FIG. 18) of the pads 504*j*, 504*k*, 504*p* and 504*q*. Conversely, when inserted vertically into host device card slot 520 as shown in FIG. 20, respective pins 522 contact the second portions (aligned along the x-axis in FIG. 18) of the pads 504*j*, 504*k*, 504*p* and 504*q*.

The pads 504*a*-504*q* of nano SD Express card 500 may have the positions and layouts as shown in FIG. 18 relative to each other and an outer perimeter of the card 500, with the pads 504*j*, 504*k*, 504*m*, 504*n*, 504*p* and 504*q* provided in the central portion 505. In one example, the "L"-shaped pads in the central portion 505 may have two sides which are 1.35 mm long, and each of the first and second sections may have a width of 0.76 mm. The pads 504*a*-504*q* may have a minimum spacing of for example 0.2 mm from its neighboring pad and edges of the card 500. It is understood that each of the above-identified dimensions, and the minimum spacing around the pads, may vary by design or within engineering tolerances in further embodiments.

Figure 21:
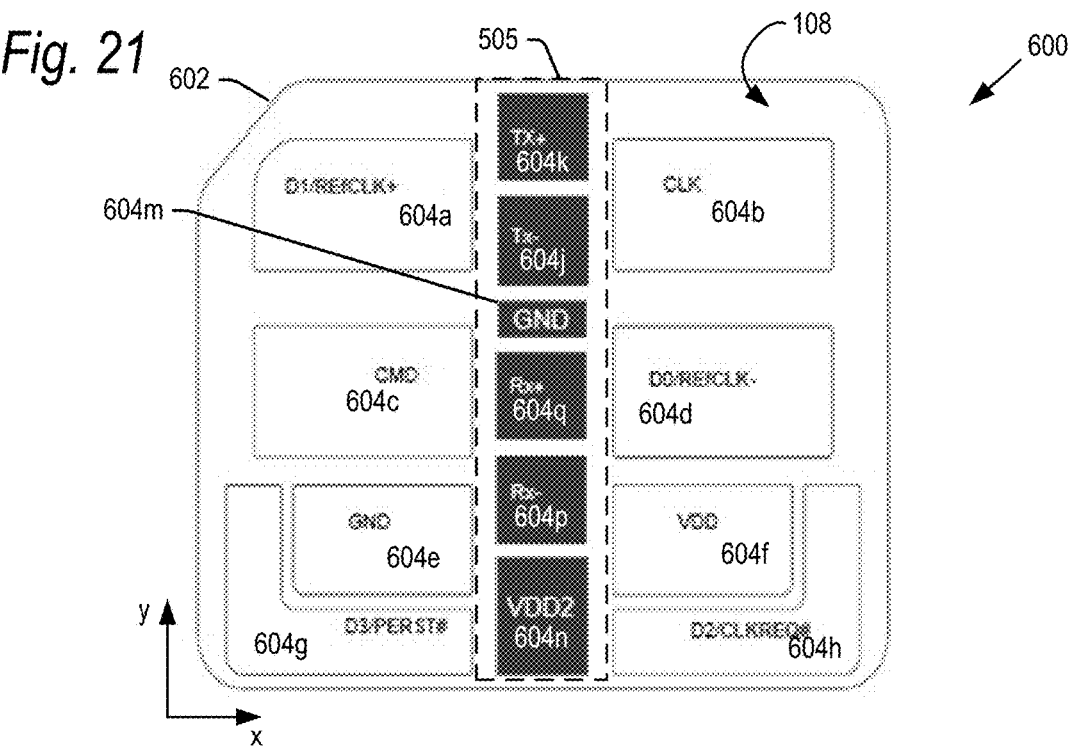
FIG. 21 is a bottom view of a nano SD Express card according to another embodiment of the present technology.

As noted above, providing at least some of the pads 504 with an "L"-shape results in benefits regarding flexibility and capacitance. However, it is understood that each of the pads 504 in the central portion 505 may be square or rectangular in further embodiments. Such an example is shown in the bottom views of FIGS. 21-23. FIG. 21 shows a bottom view of a nano Express memory card 600 which may be similar to card 500, but in this embodiment, each of the pads 604*j*, 604*k*, 604*p* and 604*q* may be square or rectangular. The width of the pads 604*m* and/or 604*n* may be made smaller (along the y-direction) to accommodate the larger size of the pads 604*j*, 604*k*, 604*p* and 604*q* in this example.

In accordance with embodiments of the present technology, the interface pads 604 are provided with a shape and layout that allow for several advantages. First, the provision of the SD/MMC pads 604*a*-604*h* together with the PCIe pads in the central portion 505 allows the nano SD Express card 600 to be backward compatible with host device card slots configured according to other communication standards, as explained below.

Figure 22:
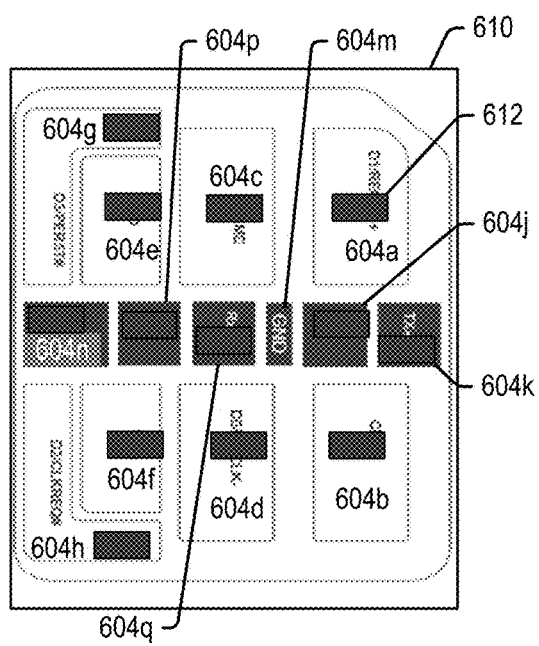
FIG. 22 is a bottom view of the nano SD Express card of FIG. 21 inserted horizontally within a host device card slot.
Figure 23:
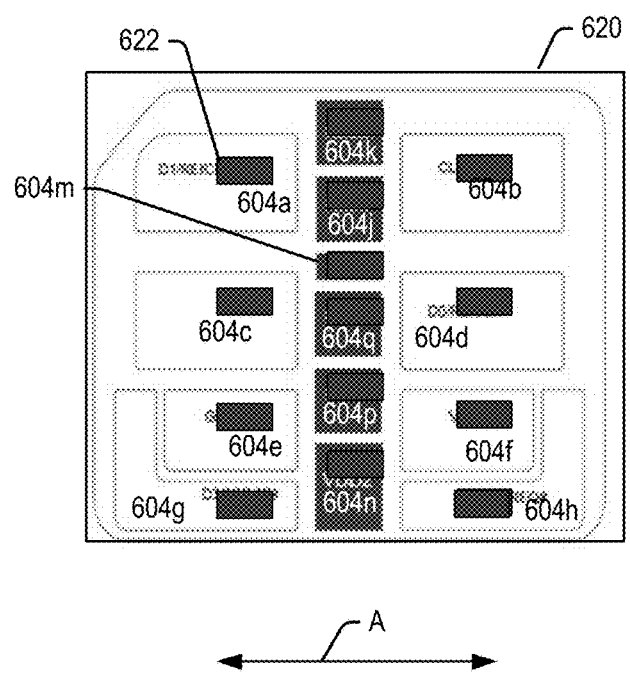
FIG. 23 is a bottom view of the nano SD Express card of FIG. 21 inserted vertically within a host device card slot.

Second, the shape and position of the pads 604 allow the nano SD Express card 600 to be inserted and used within a host device configured for either horizontal or vertical card insertion. For example, FIG. 22 shows a bottom view of the card 600 inserted horizontally in the direction of arrow A into a host device card slot 610. The card slot 610 comprises a pattern of contact pins 612 (one of which is numbered) configured to mate with the respective pads 604 of the horizontally inserted nano SD Express card 600. FIG. 23 shows a bottom view of the card 600 inserted vertically in the direction of arrow A into a host device card slot 620. The card slot 620 comprises a pattern of contact pins 622 (again, one of which is numbered) configured to mate with the respective pads 604 of the vertically inserted nano SD Express card 600.

Figure 24:
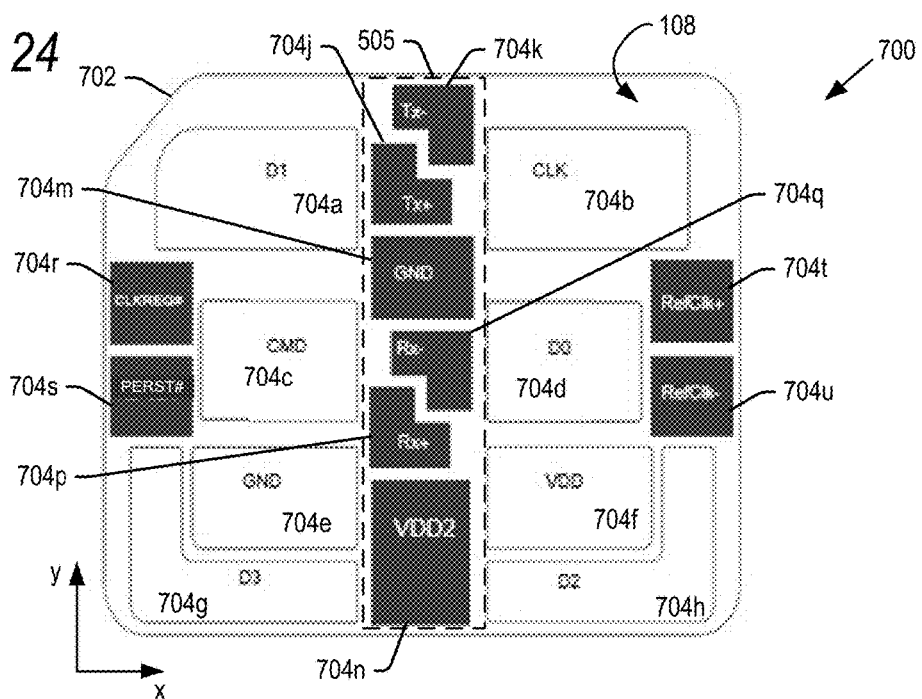
FIG. 24 is a bottom view of a nano SD Express card according to another embodiment of the present technology.
Figure 27:
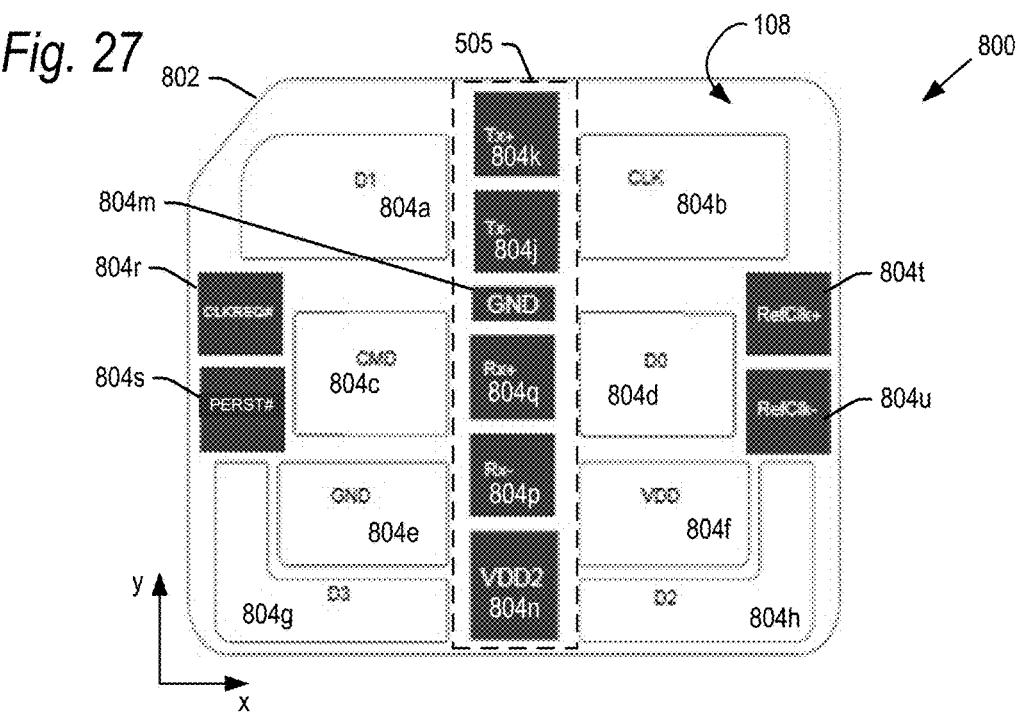
FIG. 27 is a bottom view of a nano SD Express card according to a further embodiment of the present technology.

In the embodiments of FIGS. 18 and 21, some of the pads 504, 604 are configured to function according to either the MMC/SD standards, or the PCIe standard. FIGS. 24 and 27 show further embodiments of a nano SD Express memory card including a number of pins sufficient so that there is full separation of the MMC/SD interface and the PCIe interface. For example, FIG. 24 is a bottom view of a nano SD Express memory card 700 including interface pads 704*a*-704*u*, collectively, pads 704. The memory card 700 may be the same as memory card 500 described above, with the exception that pads 704*r*, 704*s*, 704*t* and 704*u* are added to the memory card 700. These pads may be dedicated as the reference clock pads REFCLK+ and REFCLK− (704*t*, 705*u*), clock request pad CLKREQ# (704*r*), and PCIe pad PERST# (704*s*). Thus, each of the pads 704*a*-704*h* may be dedicated to the MMC or SD standards, and each of the pads 704*j*-704*u* may be dedicated to the PCIe standard (i.e., full separation of the MMC/SD interface and the PCIe interface).

In order to make room for the additional pads 704*r*-704*u*, the pads 704*c* and/or 704*d* may be made narrower (along the x-direction) relative to their sizes in card 500 or card 10. For example, in one embodiment pads 704*c* and 704*d* may each be spaced 1.8 mm from its nearest edge. These dimensions may vary in further embodiments.

Figure 25:
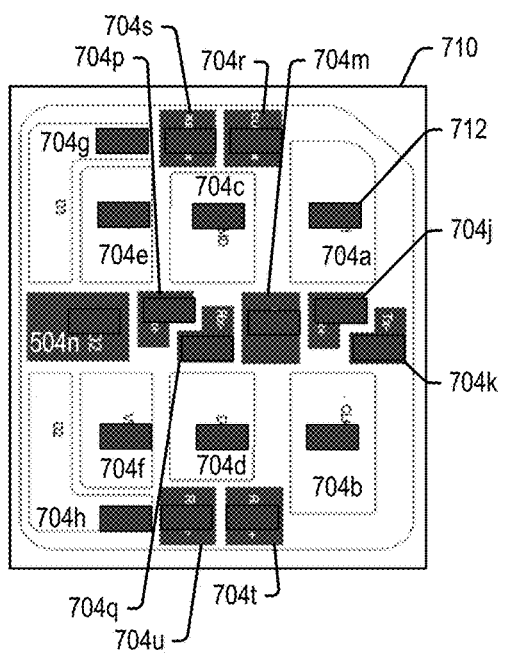
FIG. 25 is a bottom view of the nano SD Express card of FIG. 24 inserted horizontally within a host device card slot.
Figure 26:
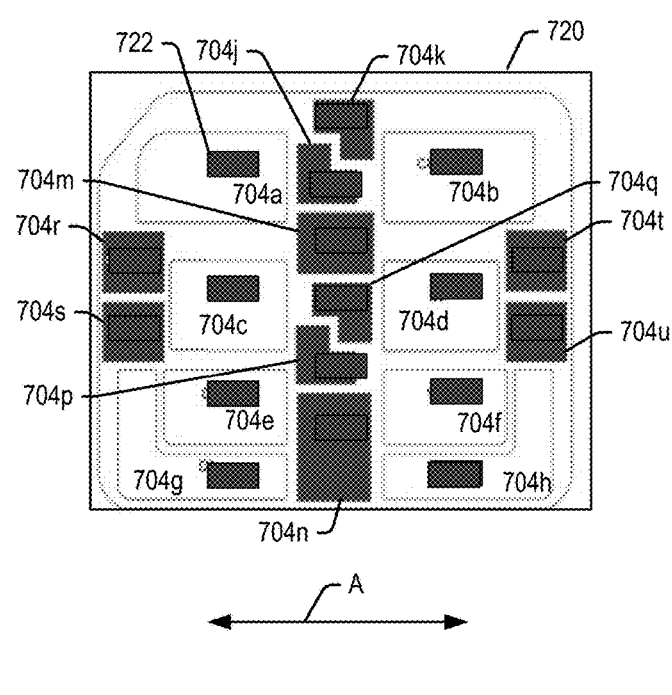
FIG. 26 is a bottom view of the nano SD Express card of FIG. 24 inserted vertically within a host device card slot.

As with card 500, the pads 704 of card 700 enable high speed data transfer using the PCIe interface, while also being backward compatible with other card standards, including the MMC and SD card standards. As with card 500, the pads 704 of memory card 700 enable insertion of the card 700 into card slots configured for horizontal or vertical card insertion. For example, FIG. 25 shows a bottom view of the card 700 inserted horizontally in the direction of arrow A into a host device card slot 710. The card slot 710 comprises a pattern of contact pins 712 (one of which is numbered) configured to mate with the respective pads 704 of the horizontally inserted nano SD Express card 700. FIG. 23 shows a bottom view of the card 700 inserted vertically in the direction of arrow A into a host device card slot 720. The card slot 720 comprises a pattern of contact pins 722 (again, one of which is numbered) configured to mate with the respective pads 704 of the vertically inserted nano SD Express card 700.

FIG. 27 is a bottom view of a nano SD Express memory card 800 including interface pads 804a-804u, collectively, pads 804. The memory card 800 may be the same as memory card 600 described above, including rectangular or square pads in the central region 505, but with the difference that pads 804r, 804s, 804t and 804u are added to the memory card 800. These pads may be dedicated as the reference clock pads REFCLK+ and REFCLK− (804t, 805u), clock request pad CLKREQ# (804r), and PCIe pad PERST# (804s). Thus, each of the pads 804a-804h may be dedicated to the MMC or SD standards, and each of the pads 804j-804u may be dedicated to the PCIe standard (i.e., full separation of the MMC/SD interface and the PCIe interface).

In order to make room for the additional pads 704r-704u, the pads 704c and/or 704d may be made narrower (along the x-direction) relative to their sizes in card 500. For example, in one embodiment pads 704c and 704d may each be spaced 1.8 mm from its nearest edge. These dimensions may vary in further embodiments.

Figure 28:
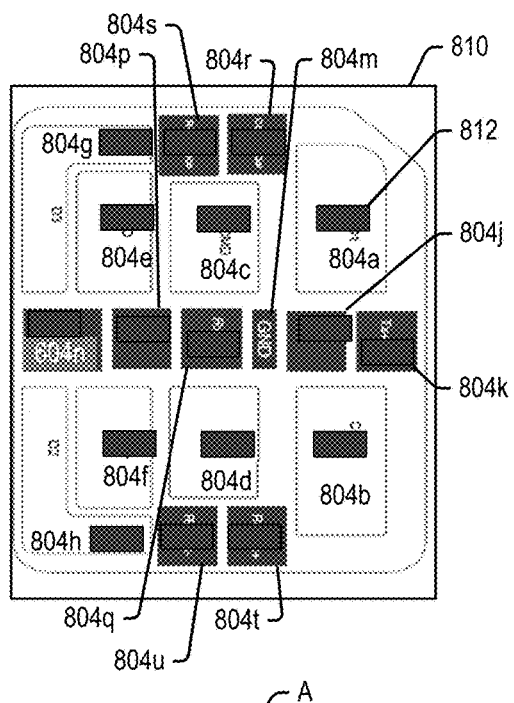
FIG. 28 is a bottom view of the nano SD Express card of FIG. 27 inserted horizontally within a host device card slot.
Figure 29:
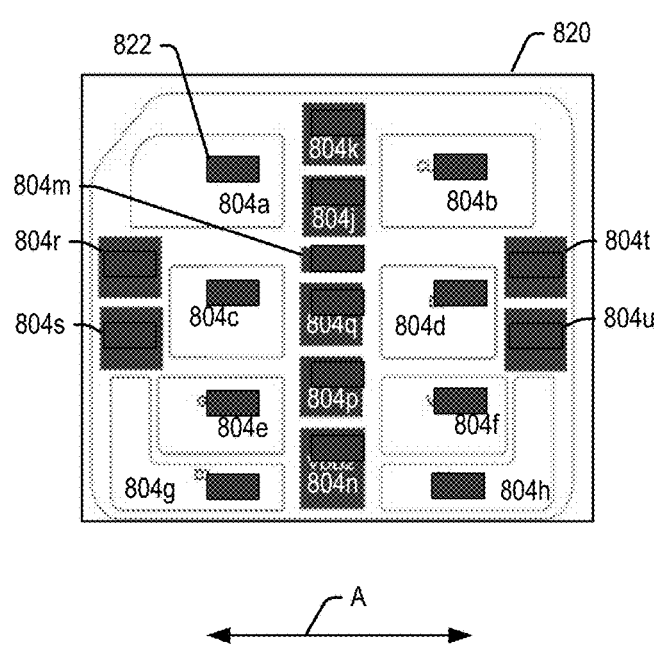
FIG. 29 is a bottom view of the nano SD Express card of FIG. 27 inserted vertically within a host device card slot.

As with card 600, the pads 804 of card 800 enable high speed data transfer using the PCIe interface, while also being backward compatible with other card standards, including the MMC and SD card standards. As with card 600, the pads 804 of memory card 800 enable insertion of the card 800 into card slots configured for horizontal or vertical card insertion. For example, FIG. 28 shows a bottom view of the card 800 inserted horizontally in the direction of arrow A into a host device card slot 810. The card slot 810 comprises a pattern of contact pins 812 (one of which is numbered) configured to mate with the respective pads 804 of the horizontally inserted nano SD Express card 800. FIG. 29 shows a bottom view of the card 800 inserted vertically in the direction of arrow A into a host device card slot 820. The card slot 820 comprises a pattern of contact pins 822 (again, one of which is numbered) configured to mate with the respective pads 804 of the vertically inserted nano SD Express card 800.

Figure 1:
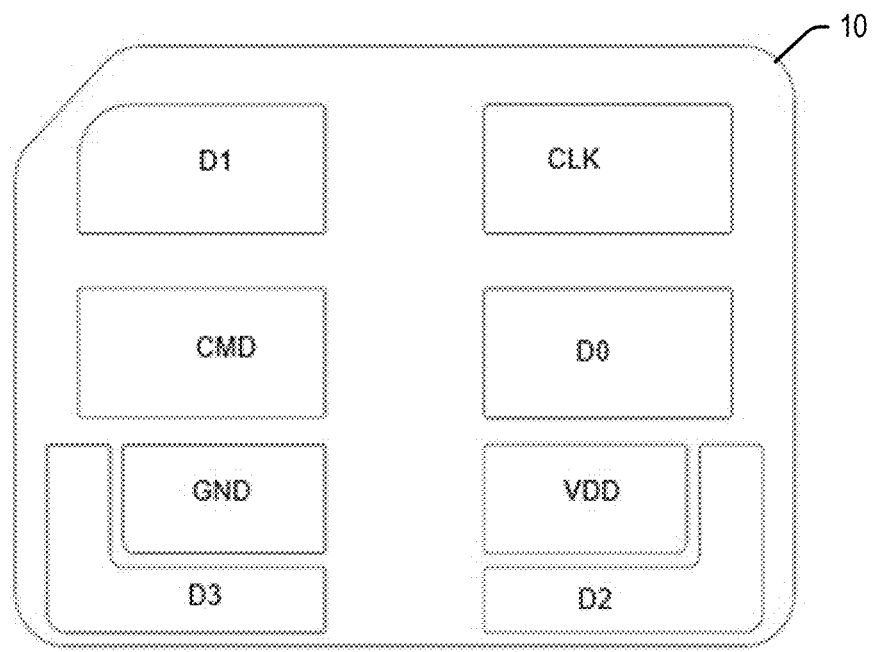
FIG. 1 is a view of a conventional nano MMC card.

It is a feature of the present technology to add PCIe pads to a memory card while maintaining, or substantially maintaining the positions of current pads of a memory card such as conventional nano memory card 10 (FIG. 1). In particular, by providing the PCIe pads in the central portion 505 in the memory cards 500 (FIG. 18), 600 (FIG. 21), 700 (FIG. 24) and 800 (FIG. 27), the layout, shape and dimensions of the pads used for example in nano SD and/or MMC cards may be kept intact. This ensures that the cards 500, 600, 700 and 800 are backward compatible with host device card slots configured according to other communication standards. For example, by including pads with the same shape, layout and functionality as nano memory card 10, the nano memory cards 500, 600, 700 and 800 are backward compatible with card slots configured for the nano memory card 10, and vice-versa. In addition cards 500, 600, 700 and 800 feature a new pads position that allows insertion current memory cards such as conventional nano memory card 10 to hosts that were designed to support full functionality of the new cards (500, 600, 700 and 800) allowing operation through the interface supported by card 10 (ie SD or MMC).

Figure 2A:
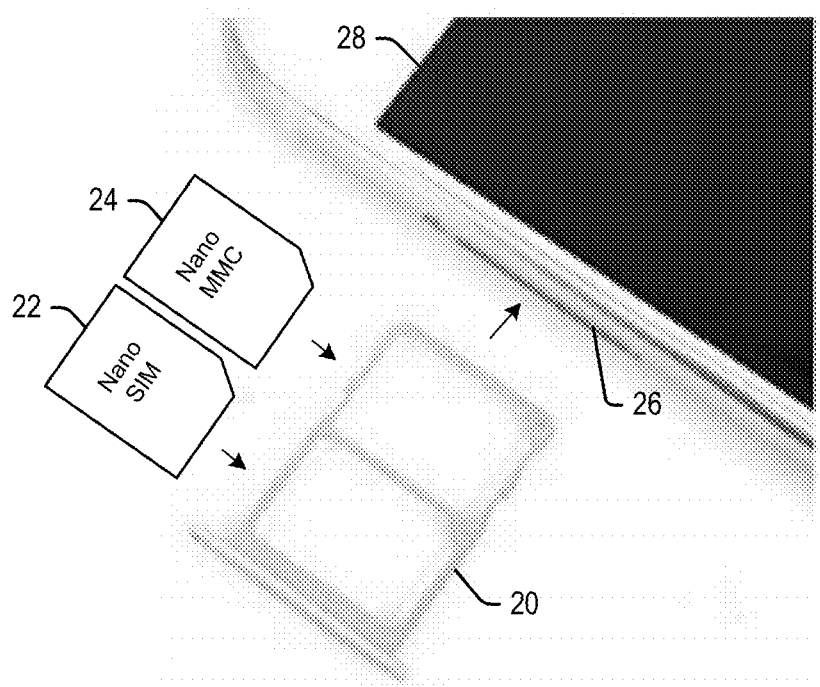
FIGS. 2A and 2B are views of conventional nano cards being inserted horizontally and vertically within a host device.
Figure 2B:
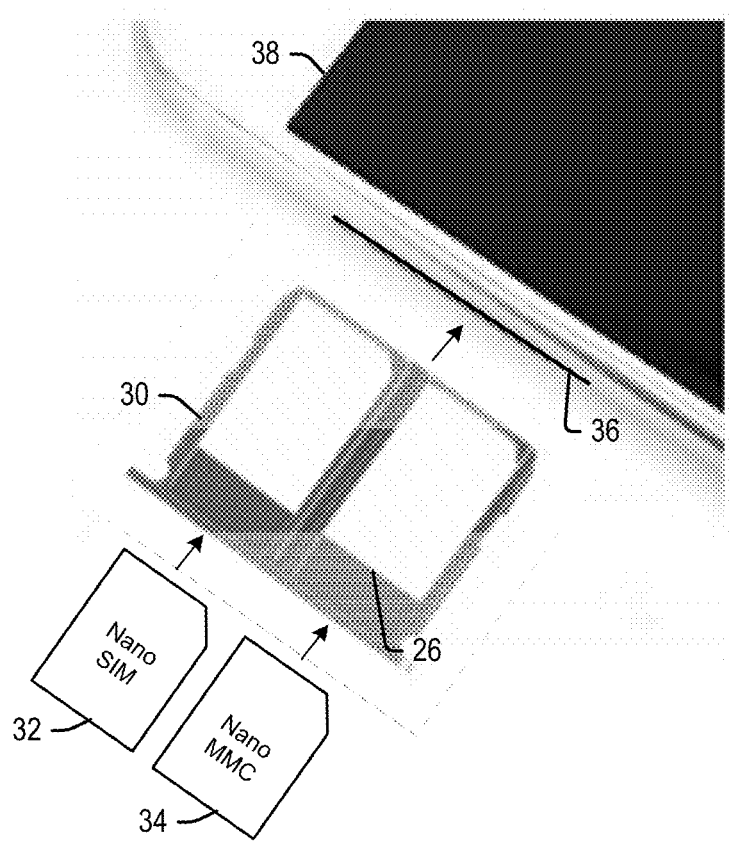
Figure 30:
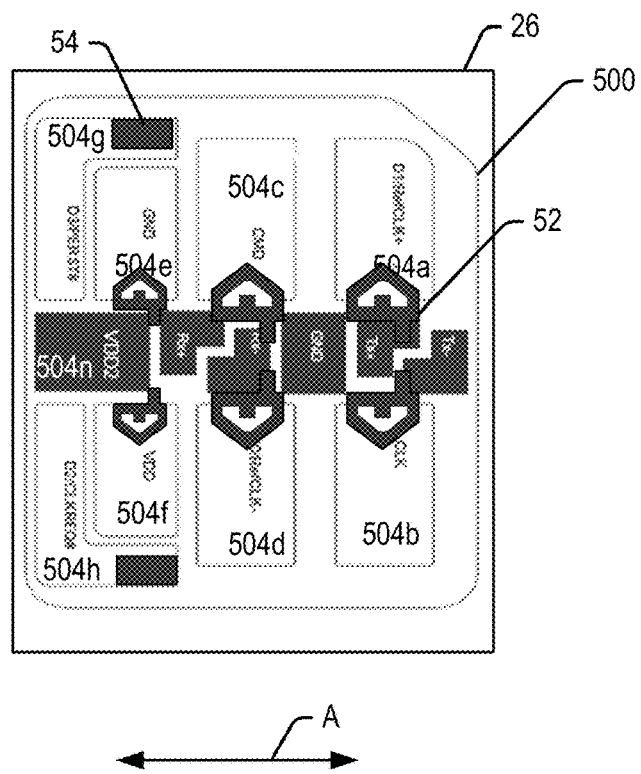
FIGS. 30 and 31 illustrate the backward compatibility of the nano SD Express cards into conventional card slots.
Figure 31:
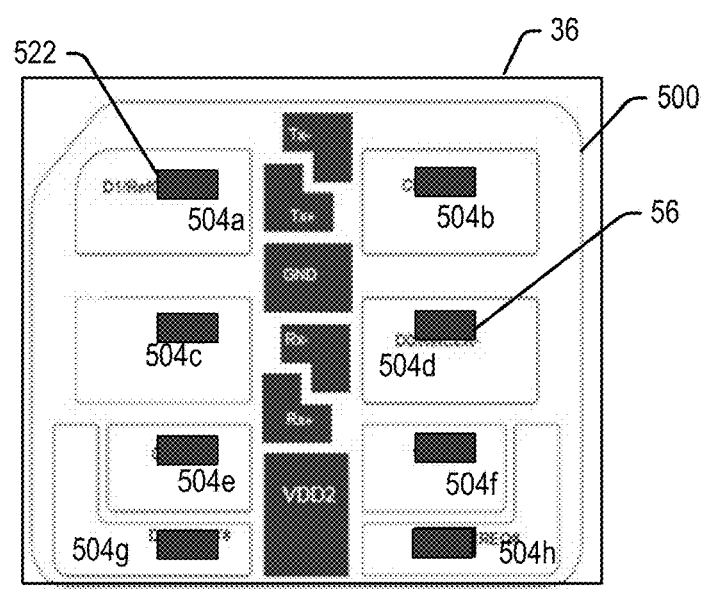

As one example, FIGS. 30 and 31 show a nano SD Express card 500 used in conventional nano card slots 26, 36 shown in FIGS. 2A and 2B, respectively. When card 500 is inserted horizontally into slot 26 (FIG. 30), the positions of pads 504a-504h mate with pins 52 and 54 provided host slot 26. When card 500 is inserted vertically into slot 36 (FIG. 31), the positions of pads 504a-504h mate with pins 56 provided host slot 36. Nano SD Express card 600 would mate with pins 52, 54 and 56 in the same manner. In the cases of the nano memory cards 700 (FIG. 24) and 800 (FIG. 27), minor modifications to the dimensions of certain SD/MMC pads are made (specifically to the CMD and D0 pads) to allow the addition of independent PCIe pads. However, these modifications are sufficiently small so that memory cards 700, 800 are still backward compatible in slots 26 and 36 as described above.

As noted above, the provision of the PCIe pads in central portion 505 has additional benefits. The small pad sizes in central portion 505 allow significantly lower capacitance, and hence better performance for the higher speed PCIe signals. Moreover, provision of the pads in central portion 505 minimizes potential conflicts with existing nano SIM or nano MMC hosts because all the new pads are out of the region of the existing host connector pins.

Figure 32:
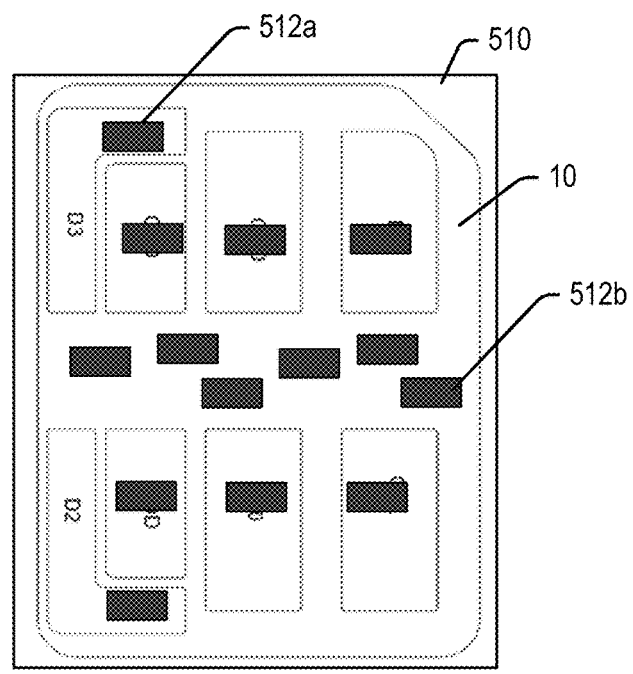
FIGS. 32 and 33 illustrate a conventional nano memory card in a card slot configured to receive a nano SD Express memory card of the present technology.
Figure 33:
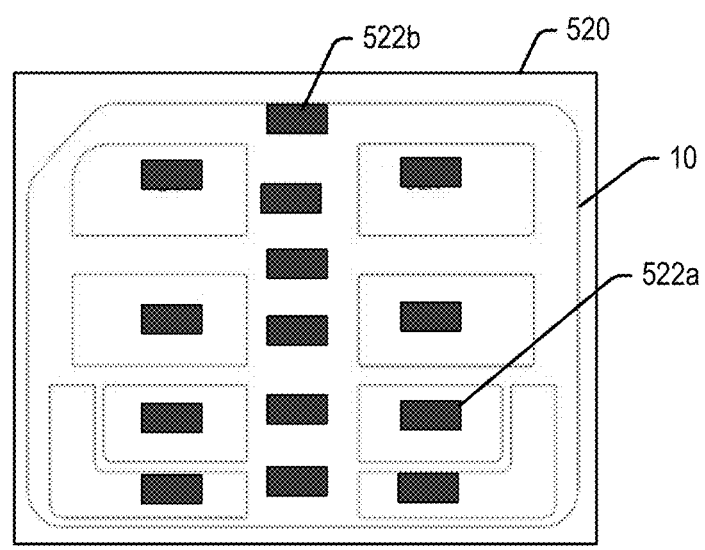

It is also true that a conventional nano memory card may be used in a host device configured to receive a nano SD Express card in accordance with embodiments of the present technology. For example, FIGS. 32 and 33 show horizontal and vertical card slots 510 and 520 configured to receive nano SD Express cards, such as memory card 500. In FIGS. 32 and 33, the card slots 510 and 520 are shown accepting a conventional nano memory card 210. As shown, card slot 510 includes pins 512a configured to mate with pads of nano memory card 10, while PCIe pins 512b go unused. Card slot 520 includes pins 522a configured to mate with pads of nano memory card 10, while PCIe pins 522b go unused. The card slots for receiving nano SD Express cards 600, 700 and 800 will also accept a conventional nano memory card 10 in the same manner.

Figure 34:
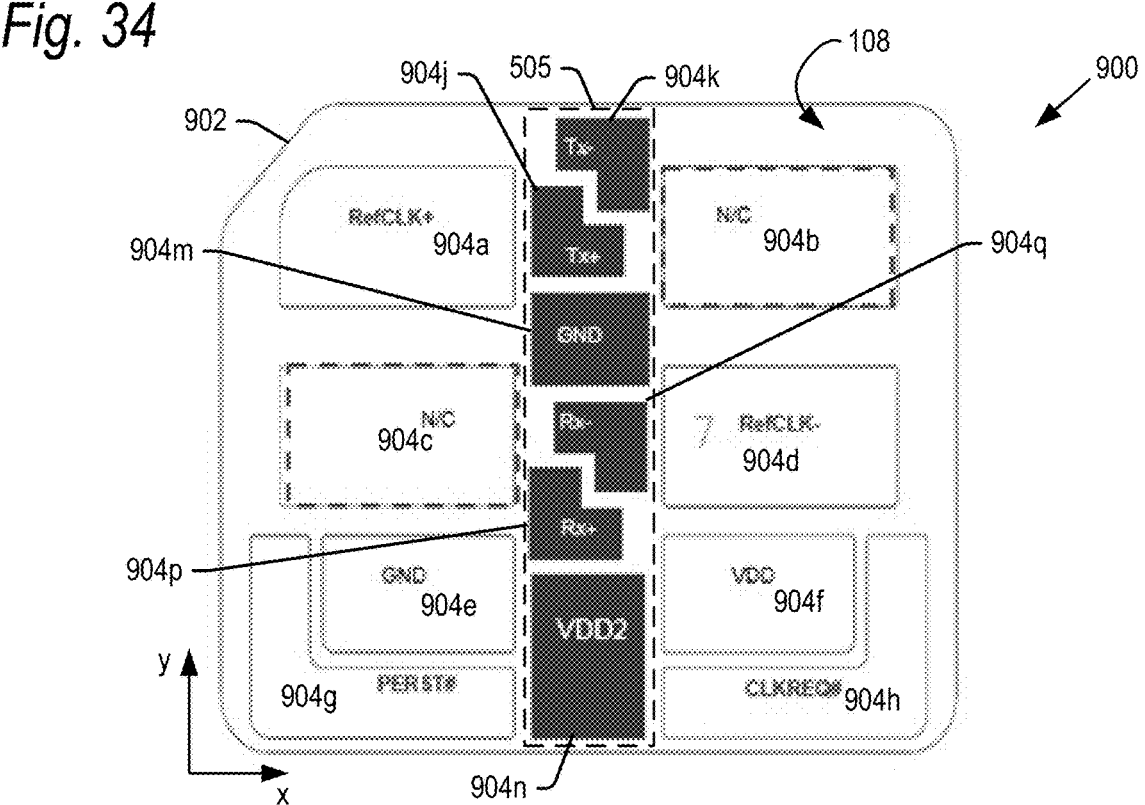
FIGS. 34-37 are bottom views of a nano Express card according to embodiments of the present technology based on the pads layout of nano SD Express card shown in FIGS. 18, 21, 24 and 27, respectively.

FIG. 34 is a view of a side 108 of a further embodiment of the present technology comprising a nano Express card 900. The nano Express card 900 is a memory card configured to operate according to the PCIe bus standard. The nano Express card 900 may include interface pads 904a-904q, collectively pads 904. Each of the pads 904 may have the same size, position and layout as one of the pads 504 of memory card 500. However, the pads 904a-904h may have PCIe functionality, but not the SD or MMC standards functionality. As such, some pads such as pads 904b and 904c, need not be connected to circuitry within the card 900, and may be omitted altogether.

As with the nano SD Express memory card 500, the nano Express card 900 may include two columns of pads 904a-904h, and a central portion 505 having PCIe pads 904j-904q. As such, the nano Express card 900 may be compatible with host device card slots configured according to other communication standards. For example, by including pads with the same shape, layout and functionality as the nano SD Express card 500 or 600, the nano Express card 900 may be used within card slots configured per the nano SD Express card standard.

Moreover, as with the nano SD Express card 500, the shape and position of the pads 904 allow the nano Express card 900 to be inserted and used within a host device configured for either vertical or horizontal card insertion. As above, several of the pads 904 have right angle portions aligned along both the x- and y-axes. These features enable the card 900 to be used in both horizontal and vertical orientations.

Figure 35:
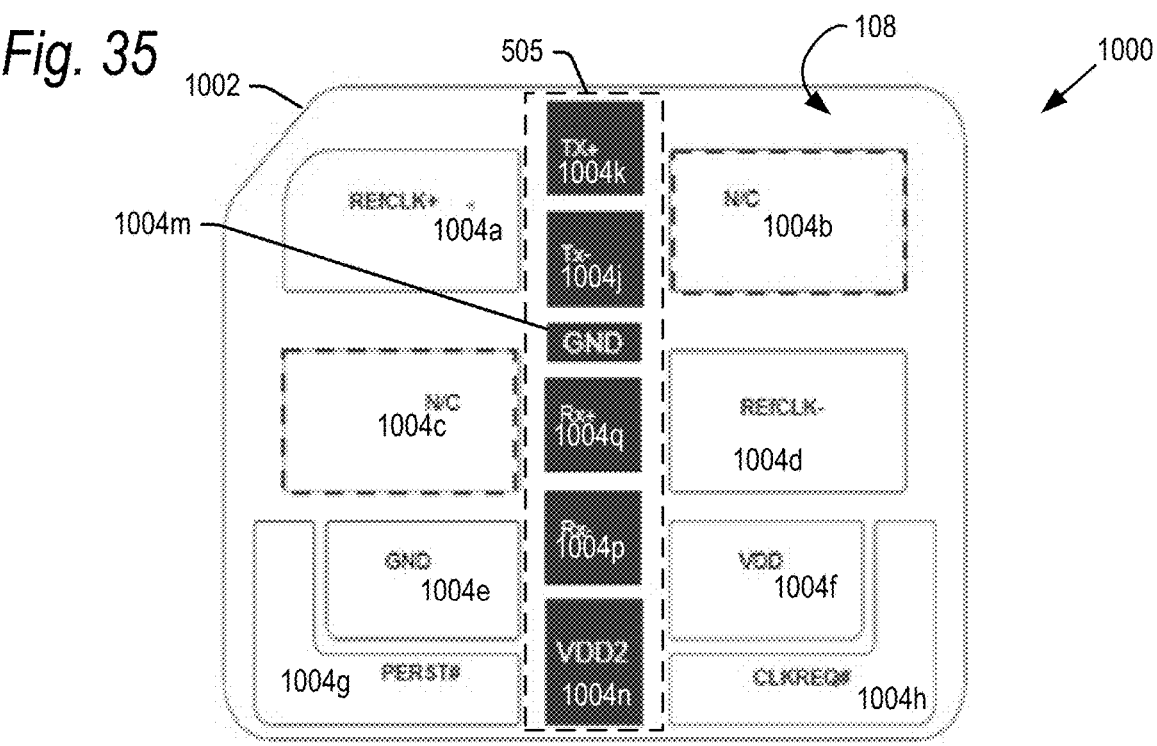

The nano Express card 900 includes "L"-shaped pads 904 in the central portion 505. However, the pads in the central portion 505 may be square or rectangular in further embodiments. FIG. 35 is a bottom view of a nano Express card 1000 including pads 1004a-1004q, collectively pads 1004. The nano Express card 1000 may be the same as nano Express card 900, with the exception that each of the pads 1004 in central portion 505 is either square or rectangular. The pads 1004m and/or 1004n may be made smaller along the y-direction relative to card 900 to make room for all of the pads 1004 in the central region 505. The nano Express card 1000 may be backward compatible with other card standards as described above and usable in either horizontal or vertical card slots in the same way as nano Express card 900.

Figure 36:
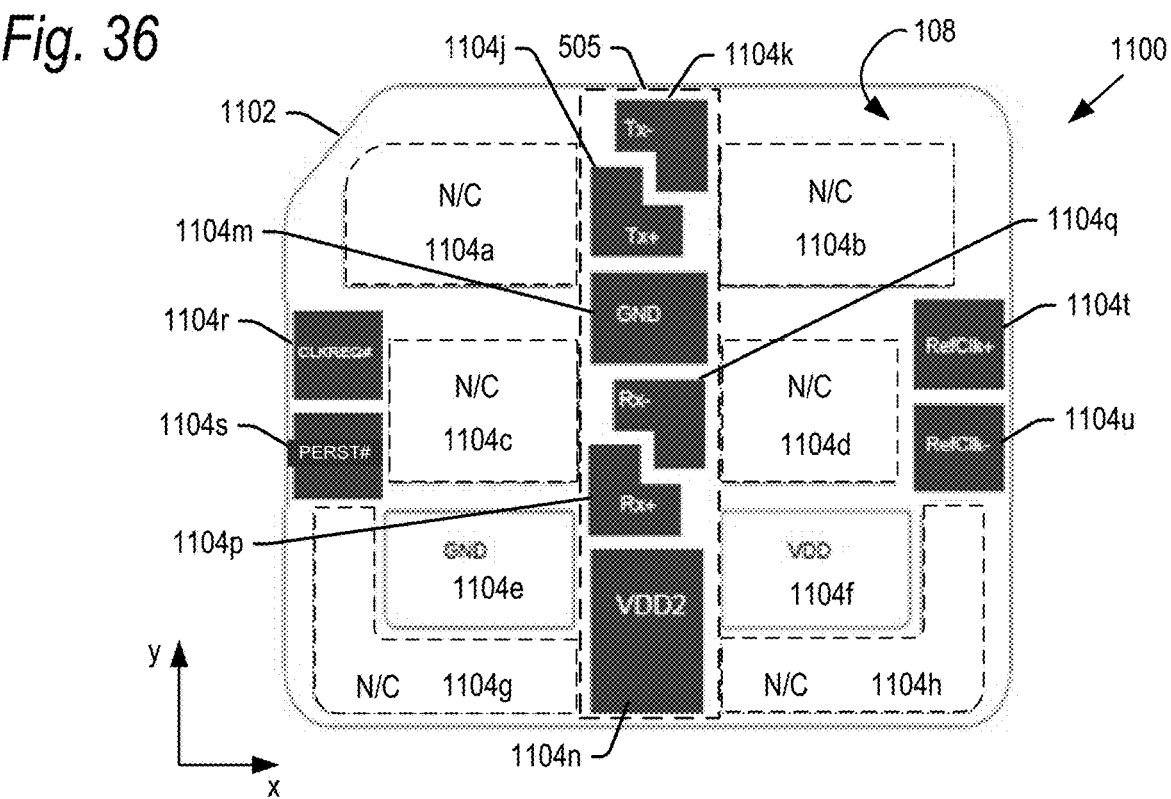
Figure 37:
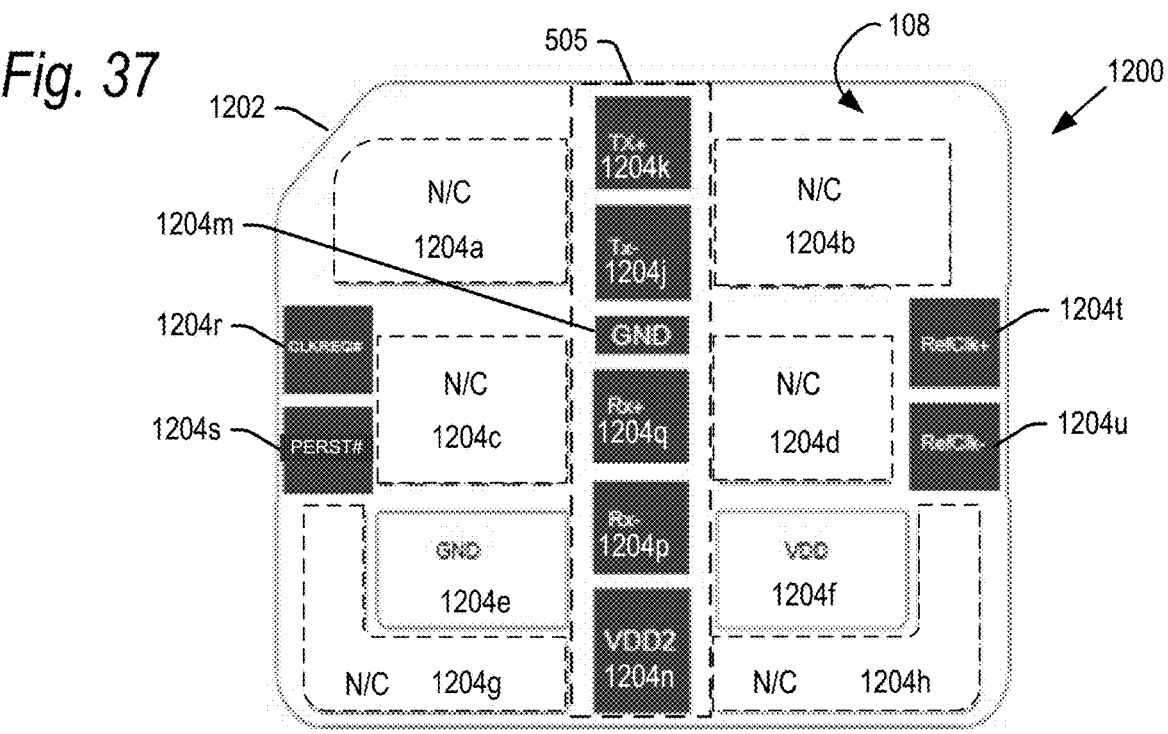

FIGS. 36 and 37 show further examples of nano Express cards 1100 and 1200, respectively that are configured to operate according to the PCIe bus standard. Nano Express card 1100 includes pads 1104a-1104u, collectively pads 1104, and nano Express card 1200 includes pads 1204a-1204u, collectively pads 1204. The nano Express cards 1100 and 1200 are the same as nano Express cards 900 and 1000, respectively, except that card 1100 is provided with additional PCIe pads 1104r, 1104s, 1104t and 1104u, and card 1200 is provided with additional PCIe pads 1204r, 1204s, 1204t and 1204u. Thus, cards 1100 and 1200 may be used in card slots configured for nano SD Express cards 700 and 800 described above with respect to FIGS. 24 and 27. Each of the pads 1104 and 1204 may have the same size, position and layout as one of the pads 704 and 804 of memory cards 700 and 800. However, since cards 1100 and 1200 do not have SD functionality, some pads such as pads 1104a-1104d and 1204a-1204d, need not be connected to circuitry within the card 1100 and 1200 respectively, and may be omitted altogether.

Figure 38:
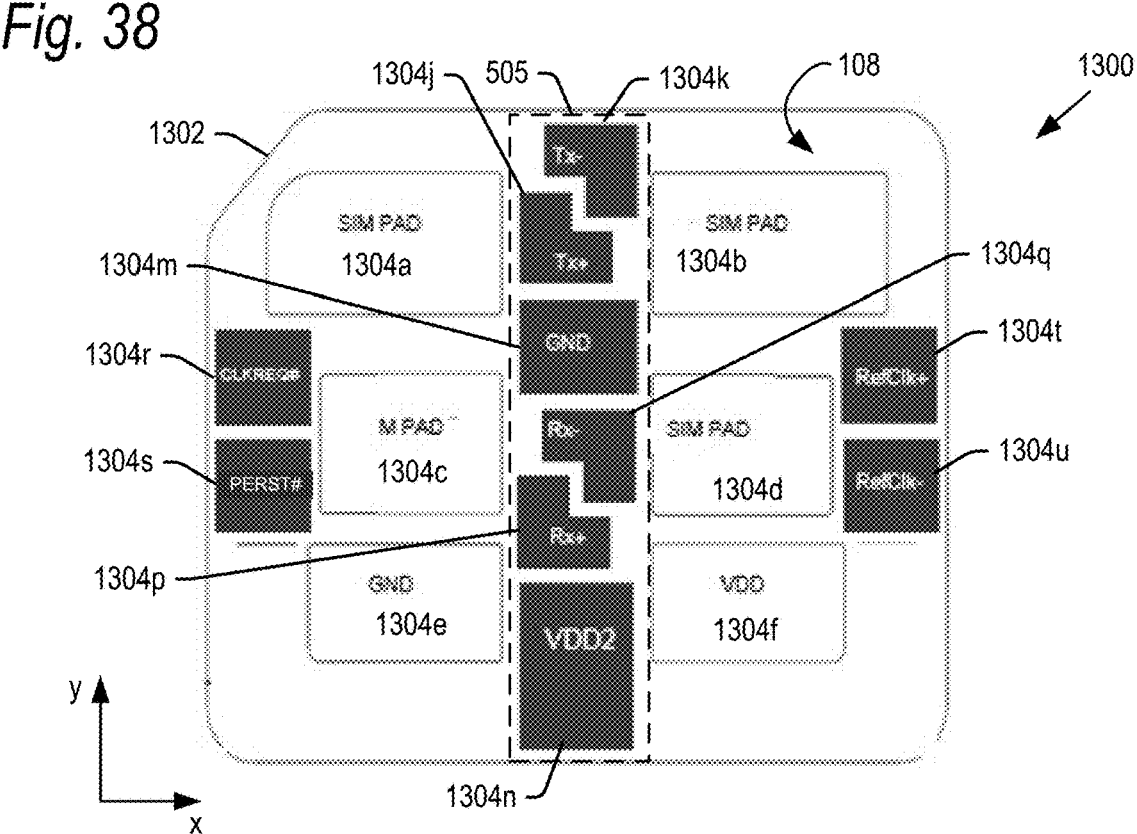
FIGS. 38-39 are bottom views of a nano Express SIM card according to embodiments of the present technology based on the pads layout of nano SD Express card shown in FIGS. 24 and 27, respectively.

FIG. 38 shows a bottom view of a nano SIM Express card 1300 including pads 1304a-1304u, collectively pad 1304. The nano SIM Express card 1300 is similar to the nano SD Express card 700 of FIG. 24, except that the SD card pads and their functionality are replaced by SIM card pads 1304a-1304f in card 1300. Those SIM card pads may correspond to the same functionality as pads 454a, 454b, 454c, 454d, 454f and 454e in card 400 of FIG. 15. As such, the card 1300 may function as a memory card using the high speed data transfer of the PCIe interface such as used by hosts of cards 700 and 800, while also being backward compatible with other card standards, including the SIM card standard. As with the above-described memory cards, the pads 1304 of memory card 1300 enable insertion of the card 1300 into card slots configured for horizontal or vertical card insertion. Such type of card may allow hosts to have dual functionality—memory card through the PCIe interface as well as SIM functionality at the same time, using a single card in a single slot.

Figure 39:
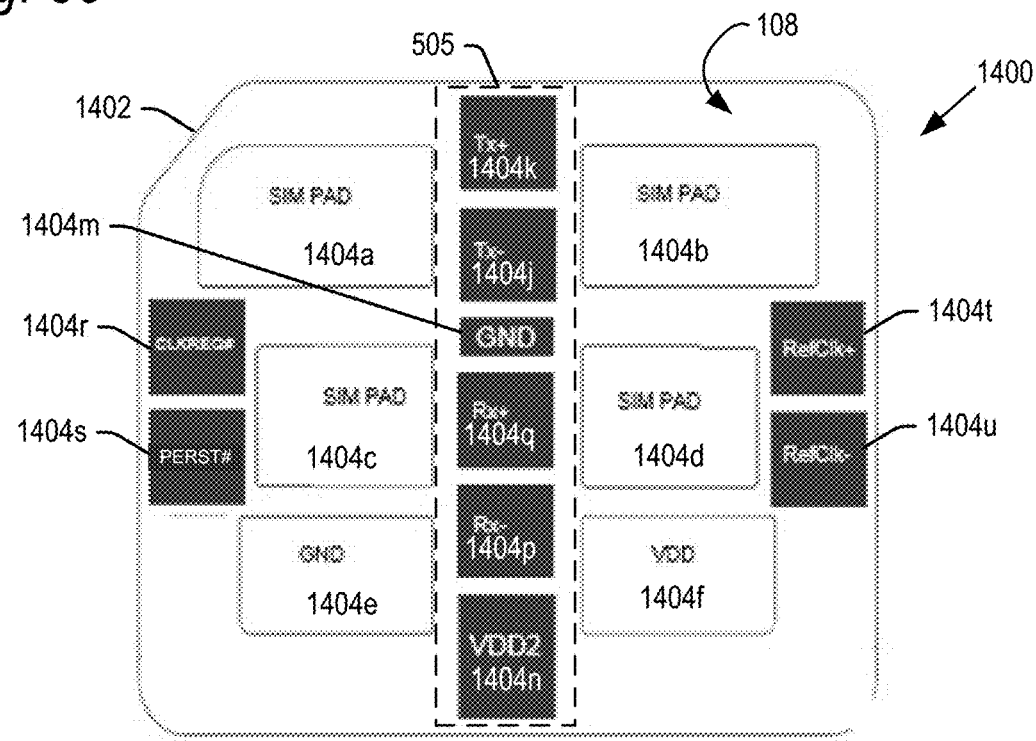

The nano Express card 1300 includes "L"-shaped pads 1304 in the central portion 505. However, the pads in the central portion 505 may be square or rectangular in further embodiments. FIG. 39 is a bottom view of a nano Express card 1400 including pads 1404a-1404q, collectively pads 1404. The nano Express card 1400 may be the same as nano Express card 1300, with the exception that each of the pads 1404 in central portion 505 is either square or rectangular. The pads 1404m and/or 1404n may be made smaller along the y-direction relative to card 1300 to make room for all of the pads 1404 in the central region 505. The nano Express card 1400 may be backward compatible with other card standards as described above for card 1300, and usable in either horizontal or vertical card slots in the same way as nano Express card 1300.

In summary, examples of the present technology relate to a memory card, comprising: a pair of opposed surfaces having a length and width of a nano SIM memory card; a first group of interface pads on one of the opposed surfaces, the first group of interface pads configured to mate with contact pins of a host device card slot operating per a PCIe memory card standard; and a second group of interface pads on one of the opposed surfaces, the second group of interface pads configured to mate with contact pins of a host device card slot operating per a second memory card standard different than the PCIe memory card standard.

In a further example, the present technology relates to a memory card, comprising: a first group of interface pads configured to mate with contact pins of a host device card slot operating per a PCIe memory card standard; and a second group of interface pads configured to mate with contact pins of a host device card slot operating per a second memory card standard different than the PCIe memory card standard; wherein at least one pad of at least one of the first and second groups has a first portion and a second portion at a right angle to the first portion.

In another example, the present technology relates to a nano SD Express memory card, comprising: a pair of opposed surfaces having a length and width of a nano memory card; a first group of interface pads on one of the opposed surfaces, the first group of interface pads configured to mate with contact pins of a host device card slot operating per a PCIe memory card standard; and a second group of interface pads on one of the opposed surfaces, the second group of interface pads configured to mate with contact pins of a host device card slot operating per an SD memory card standard.

In a further example, the present technology relates to a memory card, comprising: a pair of opposed surfaces having a length and width of a nano SIM card; interface pads on at least one of the opposed surfaces, at least one pad of the interface pads comprising: a first portion, and; a second portion at a right angle to the first portion, the first portion joining to the second portion at a position between first and second ends of the first portion, the first portion configured to be contacted by a first contact pin upon horizontal insertion of the memory card in a first host device card slot, and the second portion configured to be contacted by a second contact pin upon vertical insertion of the memory card in a second host device card slot, the first and second portions defining first and second corners configured to receive at least a second pad of the interface pads.

In another example, the present technology relates to a memory card, comprising: a pair of opposed surfaces conforming to a nano memory card form factor; first pad means on one of the opposed surfaces, the first pad means configured to mate with pin means of a host device card slot operating per a PCIe memory card standard; and second pad means on one of the opposed surfaces, the second pad means configured to mate with contact pins of a host device card slot operating per a second memory card standard different than the PCIe memory card standard.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A memory card, comprising:
   a first group of interface pads configured to mate with contact pins of a host device card slot operating per a PCI Express (PCIe) memory card standard; and
   a second group of interface pads configured to mate with contact pins of a host device card slot operating per a second memory card standard different than the PCIe memory card standard;
   wherein an interface pad of at least one of the first group and the second group has a non-rectangular shape, comprising a first portion and a second portion at a right angle to the first portion;
   wherein the first portion is configured to be contacted by a contact pin operating per one of the PCIe memory card standard and the second memory card standard upon horizontal insertion of the memory card in a first host device card slot; and
   wherein the second portion is configured to be contacted by a contact pin operating per the same one of the PCIe memory card standard and the second memory card standard upon vertical insertion of the memory card in a second host device card slot.

2. The memory card of claim 1, wherein the memory card has a nano card form factor.

3. The memory card of claim 2, wherein the second memory card standard is an SD memory card standard.

4. The memory card of claim 2, wherein the second memory card standard is a SIM memory card standard.

5. The memory card of claim 2, wherein the second memory card standard is a Multimedia Card memory card standard.

6. The memory card of claim 1, wherein the first and second groups of interface pads are provided on opposed sides of the memory card.

7. A memory card, comprising:
   a pair of opposed surfaces having a length and width of a nano SIM card; and
   interface pads on at least one of the opposed surfaces, at least one pad of the interface pads comprising:
   a first portion, and
   a second portion at a right angle to the first portion, the first portion joining to the second portion at a position between first and second ends of the first portion, the first portion configured to be contacted by a first contact pin operating per a first memory card standard upon horizontal insertion of the memory card in a first host device card slot, and the second portion configured to be contacted by a second contact pin operating per the first memory card standard upon vertical insertion of the memory card in a second host device card slot.

8. The memory card of claim 7, wherein the interface pads are provided on a single side of the memory card.

9. The memory card of claim 7, wherein the interface pads are provided on opposed sides of the memory card.

10. The memory card of claim 7, wherein the first memory card standard is an SD memory card standard.

11. The memory card of claim 7, wherein the first memory card standard is a PCIe memory card standard.

12. The memory card of claim 7, wherein the interface pads are configured to mate with contact pins of a host device card slot operating per a combination of PCIe and SD memory card standards.

13. The memory card of claim 7, wherein the first memory card standard is a Multimedia Card memory card standard.

14. The memory card of claim 7, wherein the first memory card standard is a nano SIM card standard.

15. A memory card, comprising:
   a first plurality of interface pads on a surface of the memory card, the first plurality of interface pads positioned to a first side of a central portion of the surface of the card and outside of the central portion;
   a second plurality of interface pads on the surface of the memory card, the second plurality of interface pads positioned to a second side of a central portion and outside of the central portion; and
   a third plurality of interface pads on the surface of the memory card, the third plurality of interface pads positioned entirely with central portion between the first and second pluralities of interface pads, the third plurality of interface pads comprising an interface pad having a first portion formed at an angle to a second portion;
   wherein the first and second pluralities of interface pads are configured to mate with contact pins of first and second host device card slots operating per a first memory card standard, and the third plurality of interface pins are configured to mate with contact pins of the first and second host device card slots operating per a second memory card standard different than the first memory card standard;
   wherein the first portion of the interface pad of the third plurality of interface pads is configured to be contacted by a contact pin operating per the second memory card standard upon horizontal insertion of the memory card in the first host device card slot; and
   wherein the second portion is configured to be contacted by a contact pin operating per the second memory card standard upon vertical insertion of the memory card in the second host device card slot.

16. The memory card of claim 15, wherein the first and second pluralities of interface pads are configured to mate with contact pins of the first and second host device card slots operating per a SD memory card standard.

17. The memory card of claim 15, wherein the first and second pluralities of interface pads are configured to mate with contact pins of the first and second host device card slots operating per an MMC memory card standard.

18. The memory card of claim 15, wherein the first and second pluralities of interface pads are configured to mate with contact pins of the first and second host device card slots operating per a nano SIM card standard.

19. The memory card of claim 15, wherein the third plurality of interface pins are configured to mate with contact pins of the first and second host device card slots operating per a PCIe memory card standard.

20. A memory card, comprising:
   first pad means for mating with contact pins of a host device card slot operating per a PCI Express (PCIe) memory card standard; and second pad means for mating with contact pins of a host device card slot operating per a second memory card standard different than the PCIe memory card standard;

wherein at least one of the first pad means and second pad means include a first portion and a second portion at a right angle to the first portion;

wherein the first portion is configured to be contacted by a contact pin operating per one of the PCIe memory card standard and the second memory card standard upon horizontal insertion of the memory card in a first host device card slot; and wherein the second portion is configured to be contacted by a contact pin operating per the same one of the PCIe memory card standard and the second memory card standard upon vertical insertion of the memory card in a second host device card slot.

* * * * *